US011363143B2

(12) United States Patent
Mullane et al.

(10) Patent No.: US 11,363,143 B2
(45) Date of Patent: Jun. 14, 2022

(54) METHODS AND SYSTEMS FOR REDUCING CUSTOMER SERVICE CALLS

(71) Applicant: mAdme Technologies Limited, Dublin (IE)

(72) Inventors: Triona Mullane, Dublin (IE); Gerard Carolan, County Meath (IE)

(73) Assignee: MADME TECHNOLOGIES LIMITED, Dublin (IE)

( * ) Notice: Subject to any disclaimer, the term of this patent is extended or adjusted under 35 U.S.C. 154(b) by 0 days.

(21) Appl. No.: 16/751,495

(22) Filed: Jan. 24, 2020

(65) Prior Publication Data
US 2020/0162612 A1 May 21, 2020

Related U.S. Application Data

(63) Continuation-in-part of application No. 15/157,459, filed on May 18, 2016, now Pat. No. 10,586,255.
(Continued)

(51) Int. Cl.
*G06Q 30/02* (2012.01)
*H04M 3/51* (2006.01)
(Continued)

(52) U.S. Cl.
CPC .......... *H04M 3/5183* (2013.01); *G06N 20/00* (2019.01); *G06Q 30/016* (2013.01);
(Continued)

(58) Field of Classification Search
CPC ......... G06Q 30/02; H04M 3/51; H04M 15/41
See application file for complete search history.

(56) References Cited

U.S. PATENT DOCUMENTS 9,800,727 B1 * 10/2017 Chakrabarty ....... H04M 3/5191
2003/0156133 A1 * 8/2003 Martin ................. H04M 15/00
715/747
(Continued)

FOREIGN PATENT DOCUMENTS

WO 2015/075472 A1 5/2015
WO 2017/142623 A1 8/2017

OTHER PUBLICATIONS

International Search Report and Written Opinion of the International Searching Authority received in related patent Application No. PCT/IB2021/000011 dated Jul. 8, 2021.

*Primary Examiner* — Vincent M Cao
(74) *Attorney, Agent, or Firm* — The Marbury Law Group, PLLC

(57) ABSTRACT

Methods and devices for redirecting calls made to a customer service center of an enterprise include monitoring activities of a mobile device user, predicting (e.g., based on the monitored activities, information stored in memory, or information received from another device, etc.) a reason that the mobile device user has commenced calling the customer service center or will commence calling the customer service center in the near future, selecting a media element based on the predicted reason that the mobile device user has commenced calling the customer service center or will commence calling the customer service center in the near future, and rendering the selected media element on a screen of a mobile device of the mobile device user prior to completing a call to the customer service center associated with the enterprise and until the mobile device user interacts with the mobile device or the rendered media element.

24 Claims, 28 Drawing Sheets

Related U.S. Application Data

(60) Provisional application No. 62/297,688, filed on Feb. 19, 2016.

(51) Int. Cl.
    *H04M 15/00*     (2006.01)
    *G06N 20/00*     (2019.01)
    *G06Q 30/00*     (2012.01)

(52) U.S. Cl.
    CPC ..... *G06Q 30/0202* (2013.01); *G06Q 30/0261* (2013.01); *G06Q 30/0267* (2013.01); *G06Q 30/0276* (2013.01); *G06Q 30/0281* (2013.01); *H04M 3/5175* (2013.01); *H04M 15/41* (2013.01)

(56) References Cited

U.S. PATENT DOCUMENTS

| | | | | |
|---|---|---|---|---|
| 2004/0220849 | A1* | 11/2004 | Lammers | G06Q 30/02 705/7.32 |
| 2006/0062376 | A1* | 3/2006 | Pickford | H04M 3/5235 379/265.12 |
| 2007/0133780 | A1* | 6/2007 | Berner | H04M 3/5166 379/265.01 |
| 2011/0270661 | A1* | 11/2011 | Heiser, II | G06F 16/9535 705/14.25 |
| 2012/0054029 | A1* | 3/2012 | Trice | G06Q 30/0251 705/14.49 |
| 2013/0080362 | A1* | 3/2013 | Chang | G06Q 30/0202 706/21 |
| 2013/0151343 | A1 | 6/2013 | Phan | |
| 2013/0166594 | A1 | 6/2013 | Vance et al. | |
| 2014/0297363 | A1* | 10/2014 | Vemana | G06Q 30/0269 705/7.29 |
| 2014/0359484 | A1* | 12/2014 | Morecki | G06Q 30/0263 715/753 |
| 2015/0106265 | A1* | 4/2015 | Stubblefield | G06Q 20/4016 705/44 |
| 2015/0120442 | A1 | 4/2015 | Ganesh et al. | |
| 2015/0332333 | A1* | 11/2015 | Chaudhry | G06F 16/9558 705/14.64 |
| 2015/0350428 | A1* | 12/2015 | Glass | H04M 3/5141 379/88.01 |
| 2016/0080428 | A1* | 3/2016 | Fan | H04M 3/493 709/228 |
| 2016/0292778 | A1* | 10/2016 | Zamer | G06Q 30/016 |
| 2017/0061530 | A1* | 3/2017 | Kennedy | G06Q 40/02 |
| 2017/0078490 | A1* | 3/2017 | Kaminsky | H04M 7/0039 |
| 2017/0195487 | A1* | 7/2017 | Bellosi | G06F 16/285 |

\* cited by examiner

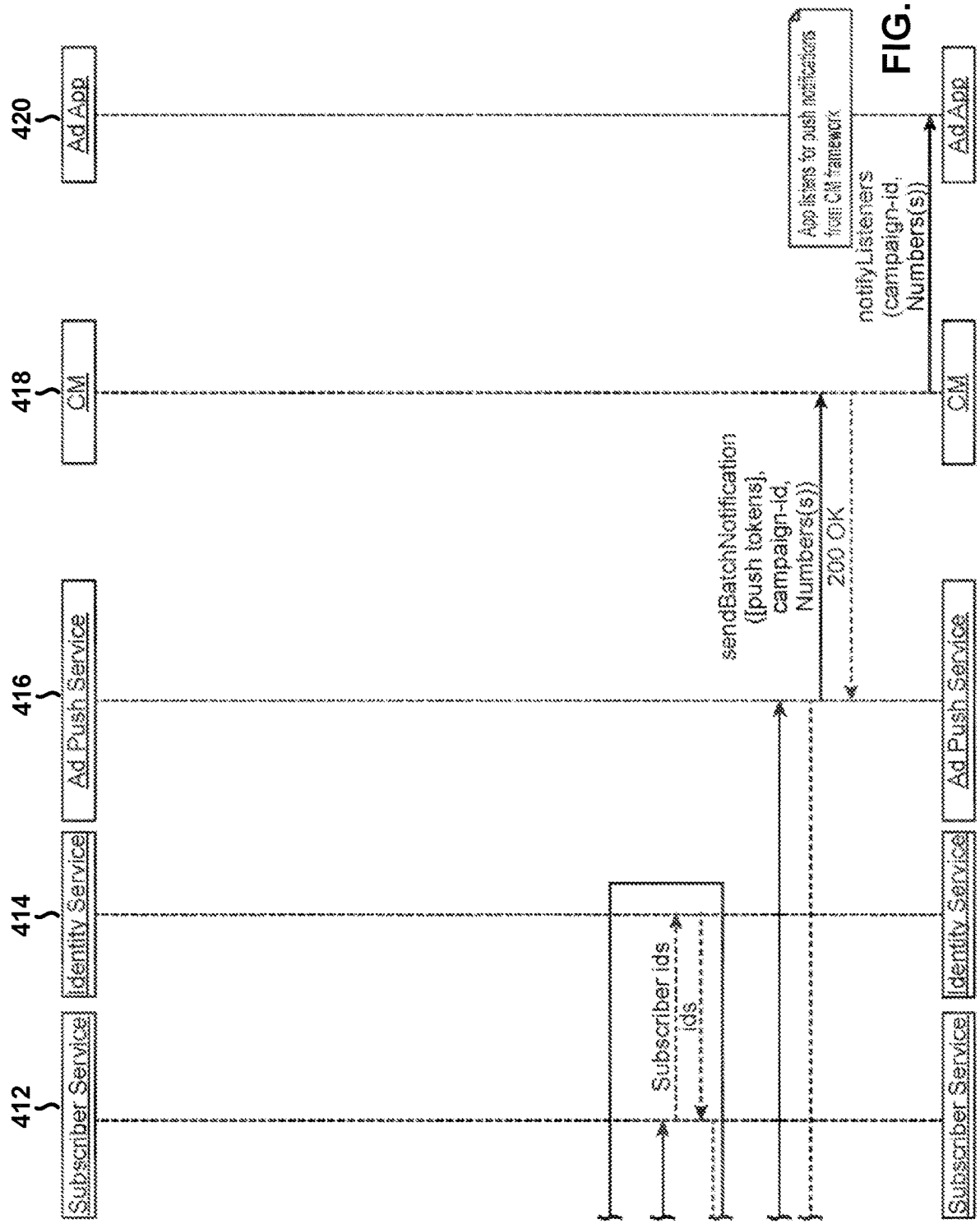

METHODS AND SYSTEMS FOR REDUCING CUSTOMER SERVICE CALLS

RELATED APPLICATIONS

This application is a continuation in part of U.S. patent application Ser. No. 15/157,459, entitled "System And Method For Displaying Advertisements On Mobile Telephone Devices After A Call" filed Aug. 24, 2017, which claims the benefit of priority to U.S. Provisional Application No. 62/297,688, entitled "System And Method For Displaying Advertisements On Mobile Devices After A Call" filed Feb. 19, 2016, the entire contents of all of which are hereby incorporated by reference for all purposes.

BACKGROUND

Advertising on mobile devices, such as smartphones, is increasingly used by advertisers to reach a wide audience of consumers. One advantage of mobile advertising over traditional advertising is that the mobile advertisements on smartphones may be narrowly tailored to the users of the smartphones. For example, mobile advertising networks such as AdMob for Android platform or iAds for iOS platform may use a targeting algorithm to select mobile ads deemed to be of interest to smartphone users based on information known about the users. Leveraging user information for targeted mobile advertising enables the advertisers to reach consumers as efficiently as possible. Users benefit by being able to view ads that are of their interest. Developers of mobile applications commonly use mobile ads to monetize the apps.

US Patent Publication No. 20150120442 is directed toward targeted mobile advertising directed at users of multiple subscriber identity modules (SIM) in a telephone. The method disclosed directs advertisements to the user's mobile phone based on whether the SIM is used for work or personal communication. US Patent Publication No. US20130151343 to Phan introduces a method of monitoring physical activity of a telephone user via sensors on the telephone, to target advertisements.

SUMMARY

In one aspect, the present application discloses methods, systems, and devices for displaying media on a mobile telephone device. In an aspect, the method may include determining by a mobile telephone device that a telephone call has been initiated between the mobile telephone device and another device, determining by the mobile telephone device a telephone number of the second telephone device, determining by the mobile telephone device that the telephone number of the second telephone device matches a campaign telephone number stored on the mobile telephone device, determining a media object to display based on the telephone number, downloading the media object on the mobile telephone device, determining by the mobile telephone device that the telephone call has ended, and displaying the media object on the mobile telephone device after the telephone call has ended. In some aspects, the media object may be an advertisement. In some aspects, the telephone call may be an outgoing call by the mobile telephone device. In some aspects, the media object may be determined based on an identity associated with the mobile telephone device. In some aspects, the media object may be downloaded during the call. In some aspects, the media object may be downloaded after the call. In some aspects, a list of campaign telephone numbers may be received by the mobile telephone device from a server computing device before the telephone call is initiated. In some aspects, the list of campaign telephone numbers may then be stored on the mobile telephone computing device.

In some aspects, the method may include determining by a mobile telephone device that a telephone call has been initiated between the mobile telephone device and a second telephone device, determining by the mobile telephone device a telephone number of the second telephone device, delivering by a mobile telephone device the telephone number of the second telephone device to a server computing device, determining a media object to display based on the telephone number, downloading the media object on the mobile telephone device, determining by the mobile telephone device that the telephone call has ended, and displaying the media object on the mobile telephone device after the telephone call has ended. In some aspects, the media object may be an advertisement. In some aspects, the telephone call may an outgoing call by the mobile telephone device. In some aspects, the media object may be determined based on an identity associated with the mobile telephone device. In some aspects, the media object may be downloaded during the call. In some aspects, the media object may be downloaded after the call.

The aspects may include methods, systems, and devices for delivering media to a mobile telephone device. In some aspects, the method may include sending a notification from a server computing device to a mobile telephone device, receiving by the server computing device a call to download a media object from the mobile computing device after a telephone call is initiated between the mobile telephone device and a second telephone device having a telephone number from the list of campaign telephone numbers, determining that the mobile telephone device is eligible to receive the media object, and delivering the media object to the mobile telephone device. In some aspects, the notification may include a campaign ID and a list of campaign telephone numbers. In some aspects, the media object may be displayed on the mobile telephone device after the telephone call is terminated. In some aspects, the media object may be an advertisement. In some aspects, the telephone call may be an outgoing call by the mobile telephone device. In some aspects, the media object may be downloaded during the call. In some aspects, the media object may be downloaded after the call.

Further aspects may include methods of reducing calls to a customer service center of an enterprise, which may include receiving, by a mobile device, a notification to automatically update campaign telephone numbers stored in the mobile device, in which the received information includes new campaign identifiers and a list of associated campaign telephone numbers used to trigger display of media objects, determining that a telephone call has been initiated between the mobile device and another device, determining a telephone number of the other device, determining whether the telephone number of the other device matches at least one of the campaign telephone numbers stored in memory, determining a media object to display based on the telephone number in response to determining that the telephone number of the other device matches at least one of the campaign telephone numbers stored in memory, downloading the media object, and displaying the media object on the mobile device.

Further aspects may include methods of redirecting calls made to a customer service center of an enterprise, including monitoring activities of a mobile device user, determining based on the monitored activities at least one of whether the mobile device user has commenced calling the customer service center associated with the enterprise, or whether there is a high probability that the mobile device user will commence calling the customer service center in the near future, predicting, based on at least one of the monitored activities, information stored in memory or information received from another device, a reason that the mobile device user has commenced calling the customer service center or will commence calling the customer service center in the near future, selecting a media element based on the predicted reason that the mobile device user has commenced calling the customer service center or will commence calling the customer service center in the near future, and rendering the selected media element on a screen of a mobile device of the mobile device user prior to completing a call to the customer service center associated with the enterprise and until the mobile device user interacts with the mobile device or the rendered media element.

Some aspects may include receiving user input indicating that the mobile device user has interacted with the mobile device or the rendered media element, and determining whether to invoke a web-based access or control mechanism of the enterprise based on the user input. Some aspects may include invoking the web-based access or control mechanism of the enterprise by launching a self-care application on the mobile device. In some aspects, monitoring activities of the mobile device user may include monitoring, by a processor in the mobile device, activities of the mobile device user.

In some aspects, monitoring activities of the mobile device user may include monitoring, by a processor in a server device, activities of the mobile device user. In some aspects, rendering the selected media element on the screen of the mobile device prior to completing the call to the customer service center associated with the enterprise and until the mobile device user interacts with the mobile device or the rendered media element may include rendering the selected media element front and center on the screen of the mobile device, on top of all other content displayed on the screen of the mobile device, prior to completing the call to the customer service center associated with the enterprise and until the mobile device user interacts with the mobile device or the rendered media element.

In some aspects, determining based on the monitored activities at least one of whether the mobile device user has commenced calling the customer service center associated with the enterprise or whether there is the high probability that the mobile device user will commence calling the customer service center in the near future may include comparing numbers entered by the mobile device user to numbers included in telephone number campaign received from a server device, and determining that the mobile device user has commenced calling the customer service center associated with the enterprise in response to determining that a sequence the numbers entered by the mobile device user match a corresponding sequence numbers included in telephone number campaign received from the server device.

In some aspects, determining based on the monitored activities at least one of whether the mobile device user has commenced calling the customer service center associated with the enterprise or whether there is the high probability that the mobile device user will commence calling the customer service center in the near future may include determining an amount of time that has passed since a bill was sent to the mobile device user, determining a frequency in which the mobile device user has contacted the customer service center within the amount of time that has passed since the bill was sent to the mobile device user, determining a frequency of user interaction with the mobile device over an immediately preceding time period, and determining whether there is the high probability that the mobile device user will commence calling the customer service center in the near future based on the frequency in which the mobile device user has contacted the customer service center within the amount of time that has passed since the bill was sent to the mobile device user and the frequency of user interaction with the mobile device over the immediately preceding time period.

In some aspects, determining based on the monitored activities at least one of whether the mobile device user has commenced calling the customer service center associated with the enterprise or whether there is the high probability that the mobile device user will commence calling the customer service center in the near future may include determining whether the mobile device is roaming, determining whether the mobile device has subscribed to a roaming package, determining a frequency in which the mobile device user has contacted the customer service center regarding bills sent to the mobile device user, and determining that there is the high probability that the mobile device user will commence calling the customer service center in the near future in response to determining that the mobile device is roaming, that the mobile device has not subscribed to a roaming package, and that the frequency in which the mobile device user has contacted the customer service center regarding bills sent to the mobile device user exceeds a threshold value.

Some aspects may include sending location information identifying the location of the mobile device to a server computing device (the server computing device determining that the mobile device is currently located in an area that is subject to a severe weather warning or potential network outage and that there is a high probability that the mobile device user will contact the customer service center in the near future), and receiving a campaign from the server computing device in response to sending the location information to the server computing device, in which selecting the media element based on the predicted reason that the mobile device user has commenced calling the customer service center or will commence calling the customer service center in the near future may include selecting the media element based on the received campaign.

In some aspects, predicting the reason that the mobile device user has commenced calling the customer service center or will commence calling the customer service center in the near future may include predicting the reason based on at least one or more of statistical modelling, case-based reasoning, lazy learners, Bayesian classifiers, distributed voting, reinforcement learning, fuzzy rule-based learning, adaptive fuzzy inference, or mixture-model techniques.

In some aspects, predicting the reason that the mobile device user has commenced calling the customer service center or will commence calling the customer service center in the near future may include predicting the reason based on at least one or more of a usage history of the mobile device, subscriber account information, artificial intelligence, machine learning, or heuristics. In some aspects, predicting the reason that the mobile device user has commenced calling the customer service center or will commence calling the customer service center in the near future may include determining, based on the usage history of the mobile device, the number of times that the mobile device user has contacted the customer service center within a time period subsequent to receiving a bill to submit payment, and predicting, based on the usage history of the mobile device, that the reason that the mobile device user has commenced calling the customer service center or will commence calling the customer service center in the near future is to submit the payment.

Further aspects include a mobile device having a memory, wireless transceiver and a processor coupled to the memory and wireless transceiver and configured with processor-executable instructions to perform operations corresponding to any of the operations summarized above. Further aspects include a mobile device having means for performing functions corresponding to any of the operations summarized above. Further aspects include a non-transitory processor-readable storage medium having stored thereon processor-executable instructions configured to cause a processor of a mobile device to perform operations corresponding to any of the operations summarized above.

Further aspects include a server computing device having a memory, communications circuitry, and a server processor configured with processor-executable instructions to perform operations corresponding to any of the operations summarized above. Further aspects include a server computing device having means for performing functions corresponding to any of the methods summarized above. Further aspects include a non-transitory processor-readable storage medium having stored thereon processor-executable instructions configured to cause a server processor of a server computing device to perform operations corresponding to any of the methods summarized above.

BRIEF DESCRIPTION OF THE DRAWINGS

The accompanying drawings, which are incorporated herein and constitute part of this specification, illustrate example embodiments of the invention, and, together with the general description given above and the detailed description given below, serve to explain features of the invention.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The word "exemplary" is used herein to mean "serving as an example, instance, or illustration." Any implementation described herein "exemplary" is not necessarily to be construed as advantageous over other implementations.

The terms "mobile device", "cellular device", and "wireless device" may be used interchangeably and refer to any one of the various cellular telephones, smart phones, multimedia enabled cellular telephones and similar electronic devices which include a programmable processor, a memory and circuitry for sending and receiving wireless communication signals. In an embodiment, the wireless device is a cellular handheld device (e.g., a mobile device), which may communicate via a cellular telephone communication network.

The terms "app", "application", "program", and "software" may be used interchangeably and may include stand-alone applications, SDKs, and modules of applications or operating systems.

Some embodiments include methods, systems, and devices for displaying advertisements on mobile telephone devices at the end of a call to a pre-designated number. In some embodiments, the system may include software and decision engines that may be configured to store one or more advertisement campaigns, a set of rules for triggering an advertisement to a caller, and to send an advertisement to a caller via a messaging service. The system may interact with the mobile user via a mobile application installed on the user's device. When a call is detected to a designated number, the system may send an advertisement to the caller's mobile telephone device based on trigger conditions at the end of the call. The system may enable an advertiser to deliver targeted advertisements to a mobile user, which may be mutually beneficial.

Figure 1:
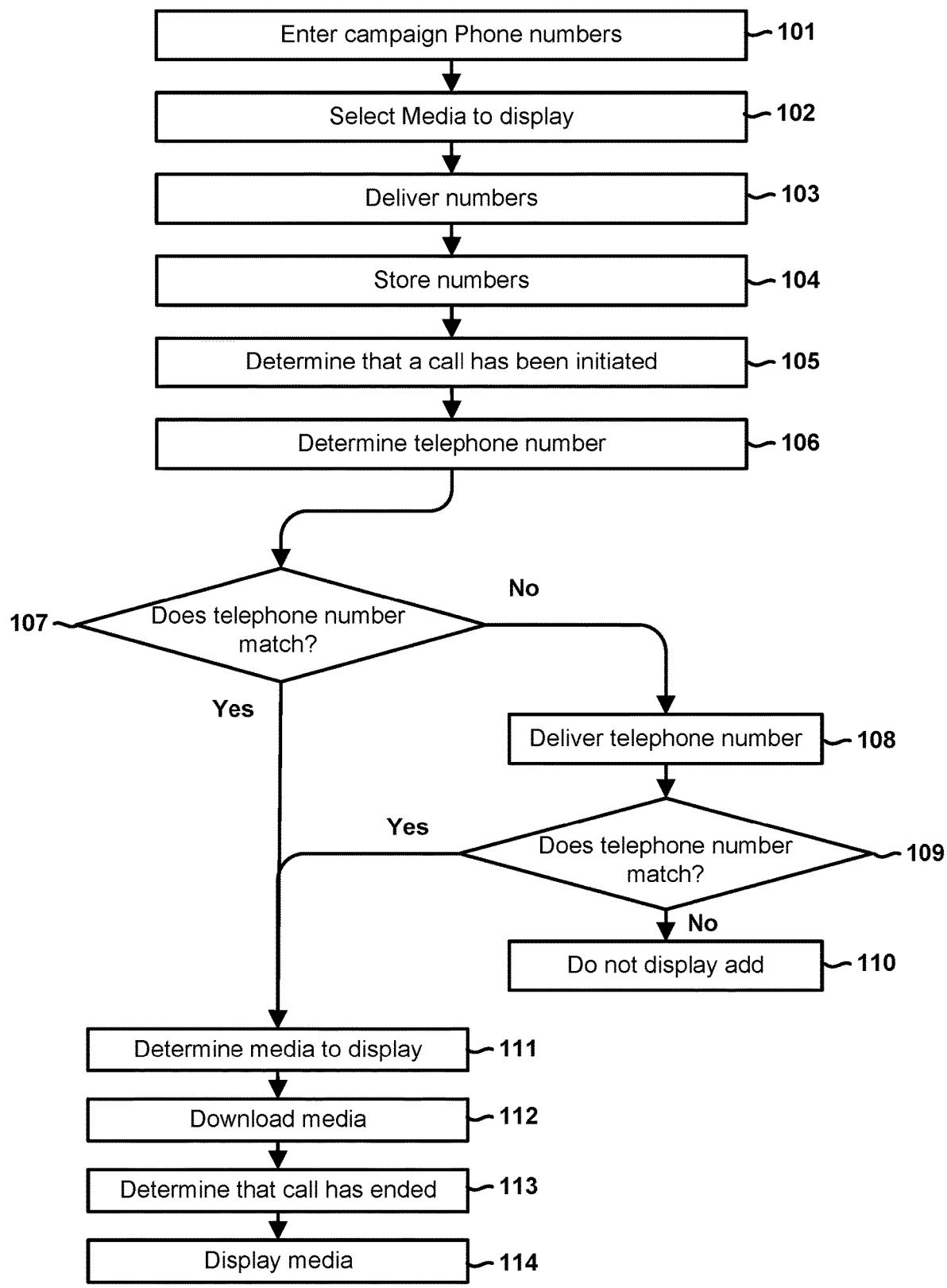
FIG. 1 illustrates an exemplary method for displaying advertisements on mobile telephone devices at the end of a call to a pre-designated number.
Figure 2:
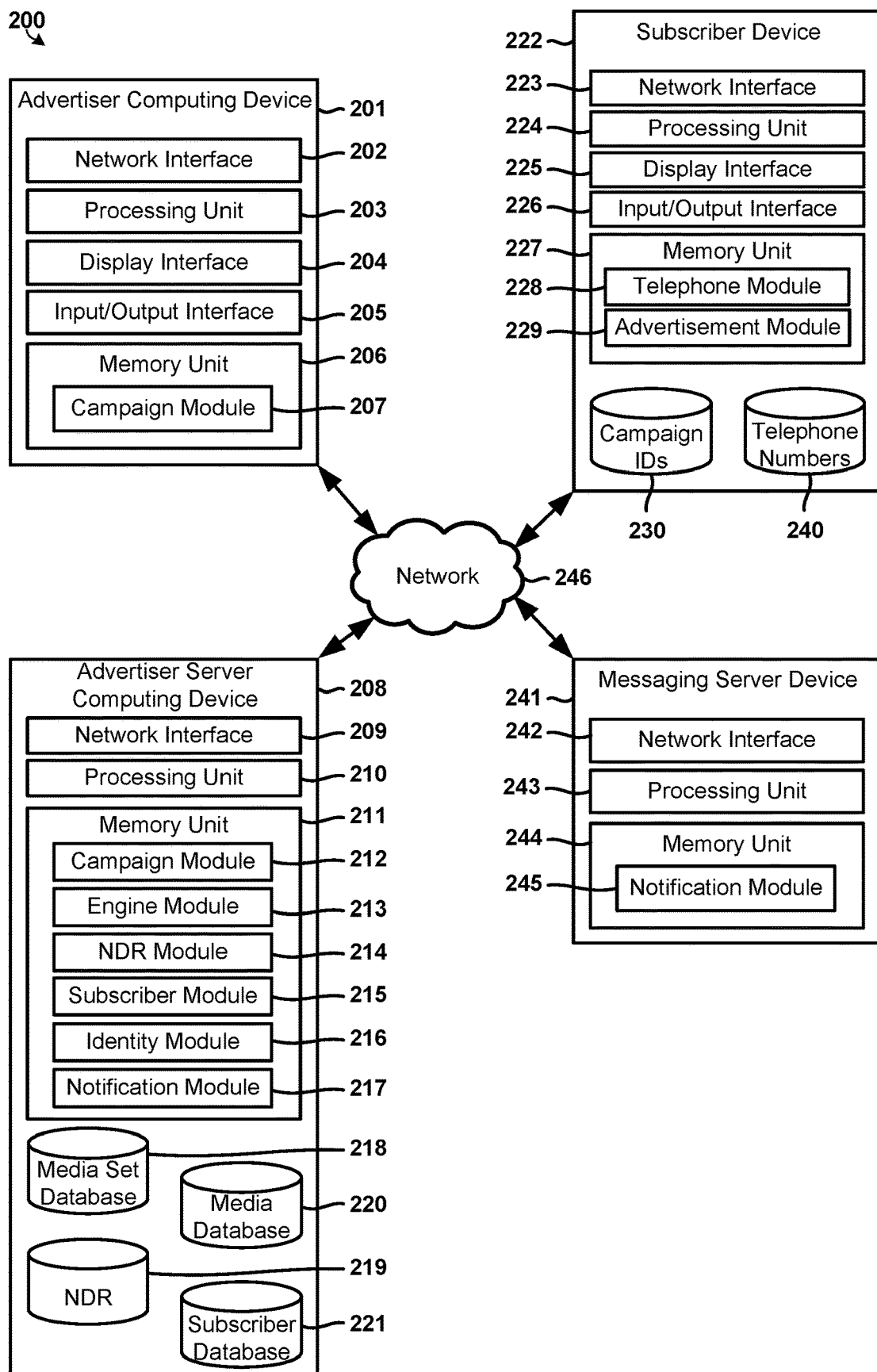
FIG. 2 illustrates an exemplary system architecture.

FIG. 1 shows a method for displaying advertisements on mobile telephone devices at the end of a call to a pre-designated number. A corresponding exemplary system architecture is shown in FIG. 2. At step 101 one or more telephone numbers associated with an advertisement campaign may be entered on an advertiser computing device 201. The telephone numbers may be delivered to an advertisement server computing device 208. At step 102 one or more media elements may be selected on the advertiser computing device 201 to be displayed on a subscriber mobile telephone device 222 after the completion of a telephone call on the subscriber mobile telephone device 222 with one of the telephone numbers. The media elements may be delivered to an advertisement server computing device 208.

At step 103, one or more of the telephone numbers may be delivered from the advertisement server computing device 208 to one or more subscriber mobile telephone devices 222 using a message and/or a notification. In an embodiment, a separate messaging server 241 may be used to deliver the notification to the subscriber mobile telephone device 222. At step 104 the telephone numbers may be stored on the subscriber mobile telephone device 222.

At step 105 the subscriber mobile telephone device 222 may determine that a telephone call has been initiated. In an embodiment, the telephone call may be an outgoing call initiated by the subscriber mobile telephone device. In an alternative embodiment, the telephone call may be an incoming call to the subscriber mobile telephone device. At step 106 the subscriber mobile telephone device 222 may determine the telephone number of the call.

At step 107 the subscriber mobile telephone device 222 may determine whether the telephone number matches one of the telephone numbers stored on the subscriber mobile telephone device 222. If the telephone number matches, at step 111 the system may determine the media to display. In an embodiment, the media may be an advertisement. At step 112 the subscriber mobile telephone device 222 may download the media. In an embodiment, media may be streamed from the server and displayed on the subscriber mobile telephone device 222 in real-time based on network conditions.

At step 113, the subscriber mobile telephone device 222 may determine that the call has ended. In response, the media may be displayed on the subscriber mobile telephone device 222 at step 114.

If at step 107 the subscriber mobile telephone device 222 determines that the number does not match a number stored on the subscriber mobile telephone device 222, the subscriber mobile telephone device 222 may deliver the telephone number to the advertisement server computing device 208 at step 108. At step 109 the advertisement server computing device 208 may determine whether the telephone number matches one of the telephone numbers associated with an advertisement campaign. If the telephone number does not match, the system may determine not to display the media at step 110. If the telephone number matches, the system may determine the media to display at step 111. At step 112 the subscriber mobile telephone device 222 may download the media. At step 113, the subscriber mobile telephone device 222 may determine that the call has ended. In response, the media may be displayed on the subscriber mobile telephone device 222 at step 114.

In an embodiment, if at step 109 the advertisement server computing device 208 determines that the telephone number does not match one of the telephone numbers associated with an advertisement campaign, the media is not displayed. In an alternative embodiment, the system may determine the media to display based on the subscriber mobile telephone device 222.

FIG. 2 illustrates an exemplary system architecture according to one embodiment. The system 200 may include one or more advertiser computing devices 201, one or more subscriber mobile telephone devices 222, one or more advertisement server computing devices 208, and one or more messaging servers 241. The computing devices 201, 222, 208, 241 may be configured to communicate over the network 246.

Computing devices 201, 222, 208, 241 may include various components including but not limited to one or more processing units 203, 210, 224, 243, memory units 206, 211, 227, 244, video or display interfaces 204, 225, network interfaces 202, 209, 223, 242, input/output interfaces 205, 226, video recording units, and buses that connect the various units and interfaces 205, 226. The network interfaces 202, 209, 223, 242 may enable the computing devices 201, 222, 208, 241 to connect to the network 246. The memory units 206, 211, 227, 244 may include random access memory (RAM), read only memory (ROM), electronic erasable programmable read-only memory (EEPROM), and basic input/output system (BIOS). The memory units 206, 211, 227, 244 may include other storage units such as non-volatile storage including magnetic disk drives, optical drives, flash memory and the like.

While FIG. 2 depicts one advertiser computing device 201, one subscriber mobile telephone device 222, one advertisement server computing device 208, one messaging server 241, and one network 246, this is meant as merely exemplary. Alternatively, any number of computing devices 201, 222, 208, 241, or networks 246 may be present. Some or all of the components of the computing devices 201, 222, 208, 241 may be combined into a single component. Likewise, some or all of the components of the computing devices 201, 222, 208, 241 may be separated into distinct components connected through the network 246.

The modules of computing devices 201, 222, 208, 241 may be implemented as software code to be executed by a processing unit 203, 210, 224, 243 using any suitable computer language. The software code may be stored as a series of instructions or commands in a memory unit 206, 211, 227, 244. While specific modules are shown as part of specific computing devices 201, 222, 208, 241, modules may additionally or alternatively be integrated into any of the other computing devices 201, 222, 208, 241. Any of the described modules may be standalone applications, part of the device operating system, or incorporated into other modules or applications.

Advertiser computing device 201 may include a campaign module 207. Subscriber mobile telephone devices 222 may include a telephone module 228 and an advertisement module 229. Subscriber mobile telephone devices 222 may include locally stored campaign IDs 230 and telephone numbers 240.

Advertisement server computing device 208 may include a campaign module 212, an engine module 213, a Number Domain Registry (NDR) module 214, a subscriber module 215, an identity module 216, and a notification module 217. Advertisement server computing device 208 may include a media set database 218, a media database 220, an NDR 219 repository, and a subscriber database 221.

System 200 may incorporate a messaging server 241 configured to deliver messages to subscriber mobile telephone devices 222. Messaging servers 241 may include a notification module 245. In an embodiment, the messaging server 241 may be a separate device from the advertisement server computing device 208. In an alternative embodiment, the advertisement server computing device 208 and the messaging server 241 may be combined into a single device.

Campaign modules 207, 212 may be configured to create media campaigns. Telephone module 228 may be configured to communicate with other telephone devices over a telephone network. Advertisement module 229 may be configured to receive notifications and/or messages containing campaign IDs and campaign telephone numbers, store containing campaign IDs and campaign telephone numbers, determine whether a called number is associated with a campaign, determine when to display an advertisement, determine which advertisement to display, retrieve advertisement media, and display the advertisement. In an embodiment, advertisement module 229 may incorporated into telephone module 228 or any other application on the subscriber mobile telephone device 222.

Engine module 213 may be configured to create and store the campaign metadata and expose an application programming interface (API) to the subscriber mobile telephone devices 222 to request to download campaigns to the device. The NDR module 214 may be configured to store the telephone numbers used to trigger the display of an advertisement in the NDR 219. NDR 219 may be used as a repository for any campaigns that use telephone number triggers. NDR module 214 may expose an API to other components to allow them add/edit/lookup/delete telephone numbers on the platform. If a new campaign is created with a telephone number trigger, the engine module 213 may use the NDR API to store the phone number(s) associated with this campaign in the NDR 219.

Subscriber module 215 may provide a representational state transfer (REST) API for create, read, update and delete (CRUD) operations against the subscriber database 221. Identity module 216 may provide an API for authentication and authorization functions. Identity module 216 may also provide APIs to perform CRUD operations on subscribers. Notification modules 217, 245 may be configured to send notifications or messages to subscriber mobile telephone devices 222.

Figure 3:
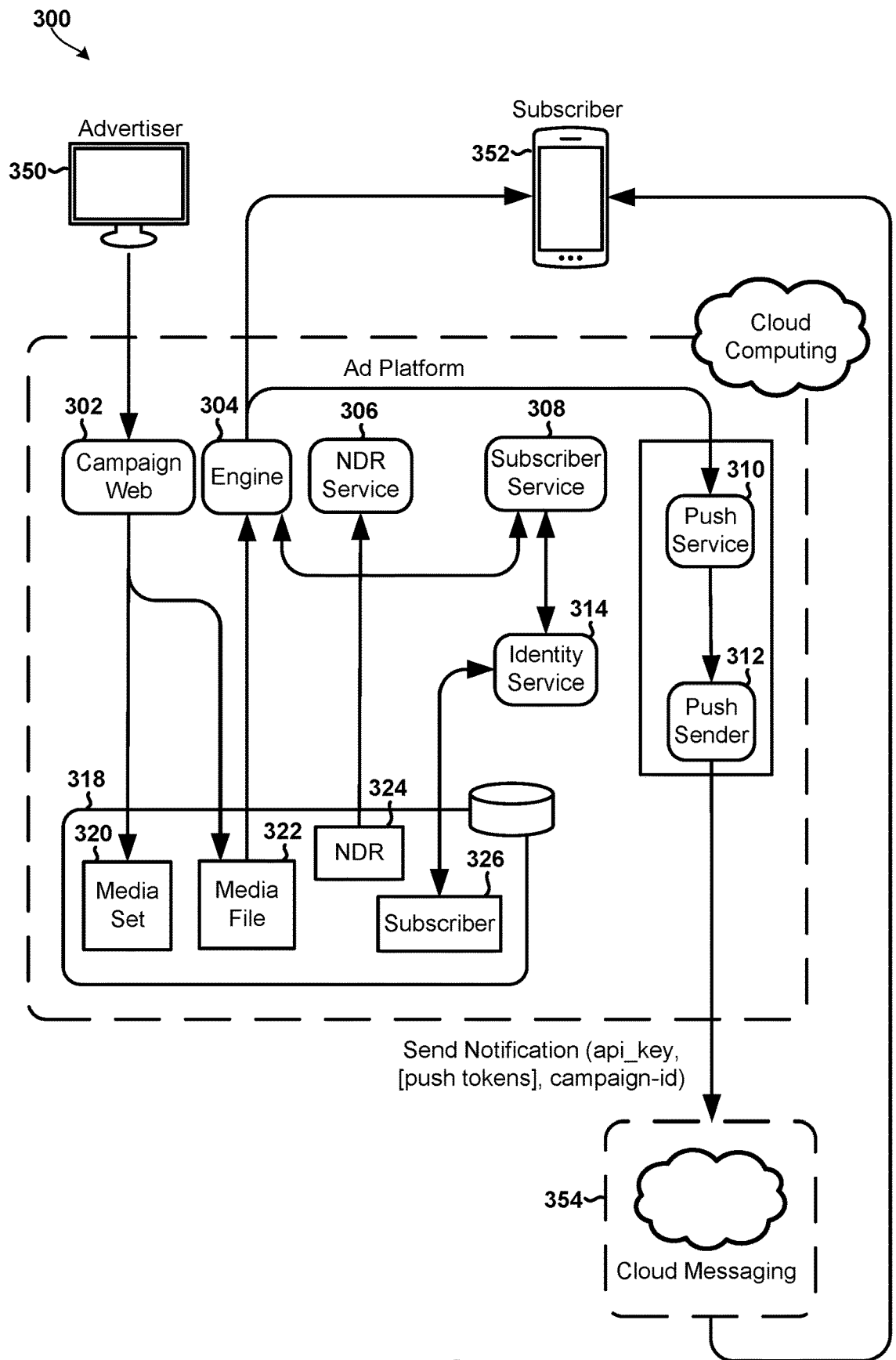
FIG. 3 illustrates an exemplary embodiment of a system for delivering a targeted advertisement to a mobile user at the end of a call.

FIG. 3 shows an exemplary embodiment of a system 300 for delivering a targeted advertisement to a mobile user at the end of a call. The system 300 includes a campaign web 302 portal, an engine 304 service, a number domain registry (NDR) service 306, a subscriber service 308, a push service 310 and a push sender 312.

The campaign web 302 portal may be used by advertisers 350 to create the telephone number campaigns via a web based user interface. The campaign web 302 portal may call a REST API to create new campaigns. The campaign web 302 portal may also create and store media sets 320 and media files 322.

The engine 304 component may be the service that creates and stores the campaign metadata and exposes an API to the clients to request to download campaigns to a subscriber device 352. The ad metadata may be stored in several database tables 318. The ad media set 320 may be stored on a filesystem. The engine 304 component may be configured to notify any registered devices (e.g., subscriber device 352) when a new telephone number campaign is created on the campaign web 302 portal (e.g., via a cloud messaging (CM) notification, API request/response messages, etc.). The NDR service 306 may be the component used to store the phone numbers used to trigger the display of an ad. It may be used as a repository for any campaigns that use telephone number triggers. It may expose an API to other components to allow them to add/edit/lookup/delete telephone numbers on the platform. If a new campaign is created with a telephone number trigger, the engine 304 service may use the NDR API to store the phone number(s) associated with this campaign in the NDR 324 repository.

The push service 310 may be used to send platform-initiated messages to clients using the cloud messaging framework. It may send batch notifications to a CM service 354 when other platform services need to send notifications to the devices. The system may include an identity service 314 that provides an API to request OAuth2 tokens for the ad service. Clients acquire a valid OAuth2 access_token from the token endpoint before making any calls to the private endpoints. The access token may be sent to the server using a hypertext transfer protocol (HTTP) Authorization bearer token header. Every client may be registered with the identity service 314. It may also provide APIs to perform CRUD operations on subscribers.

The subscriber service 308 may provide a REST API for CRUD operations against the subscriber 326 database table. With this API the other services may lookup details about a subscriber who is provisioned on the platform. A subscriber's CM push token may be retrieved from the subscriber service 308 in order to send notifications via CM to their mobile device (e.g., subscriber device 352). Subscriber service 308 may use an identity service client to call the identity service API to request information on subscribers. The client in various embodiments could be a mobile application that receives the CM notification message. The client may be configured in various embodiments to display an ad to a user based on one of various triggers configured on the campaign web 302 portal when a campaign is configured. A subscriber may be a mobile device user who has the ad app or ad software development kit (SDK) installed on their device (e.g., subscriber device 352) and who has registered with the ad back end platform.

Figure 4:
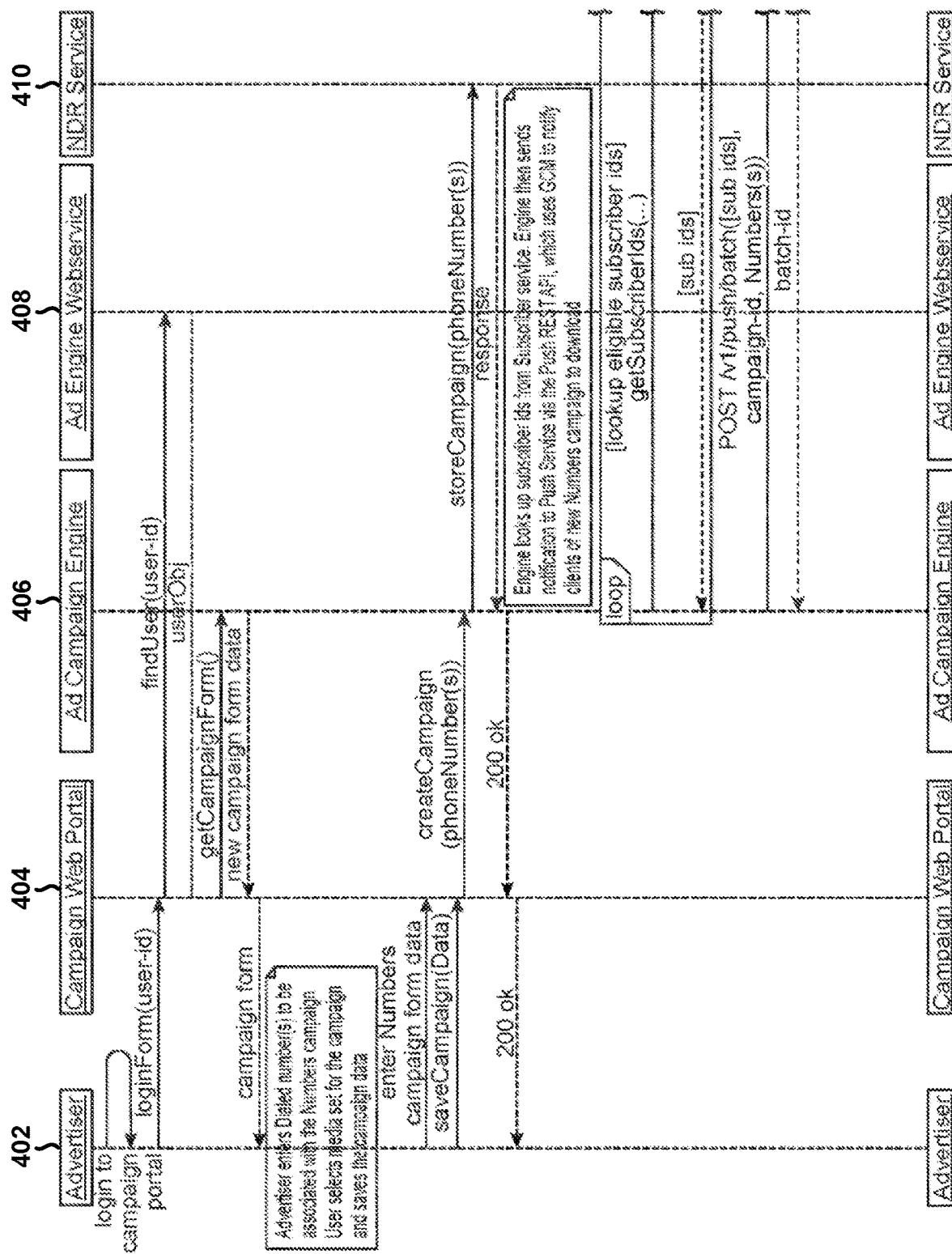
FIG. 4 illustrates an embodiment for a method of creating an advertisement campaign.

An embodiment for a method of creating an advertisement campaign is disclosed in FIG. 4. In one embodiment the advertiser 402 logs into the ad campaign portal 404 using login credentials provided to them. The ad campaign portal 404 may query an ad engine webservice 408 to retrieve a user object. The advertiser 402 may select to create a new ad campaign. The advertiser 402 may select the ad trigger type to be a dialed number trigger as part of the ad creation. They may enter the phone number(s) to be used to trigger the campaign at the end-of-call event. They may select the media to be displayed on the mobile device when the telephone number campaign is triggered. The advertiser 402 may save their new campaign and the ad campaign engine 406 takes the form data and stores this information in the database.

When the campaign is approved it will become active and is then available for clients to download. The ad campaign engine 406 may request the subscriber IDs (subscriber-id, push token) by calling the subscriber service 412. The subscriber service 412 may call the identity service 414 to get the IDs for each subscriber that is eligible to receive this new campaign notification. The subscriber service 412 may return the list of IDs to the ad campaign engine 406 service so it can create a batch push notification. The ad campaign engine 406 may call the push service 416, such as by posting a batch request with the subscriber IDs, campaign id, list of dialed numbers, and notification type. The push service 416 may create a batch notification request to send to the CM 418 service. The push service 416 may send the batch notifications to the CM 418 service. In an embodiment, the batch size may be approximately 1000. Multiple push notifications may need to be sent to the CM 418 service to notify all active clients of the new telephone number campaign. The CM 418 service may forward the push notification to each device that has a push token. The ad app 420 or ad SDK on the device may receive the push notification, and using the campaign id from the notification, call the ad campaign engine 406 to request to download the campaign from the server. The campaign may be downloaded while the call is on-going.

Figure 5:
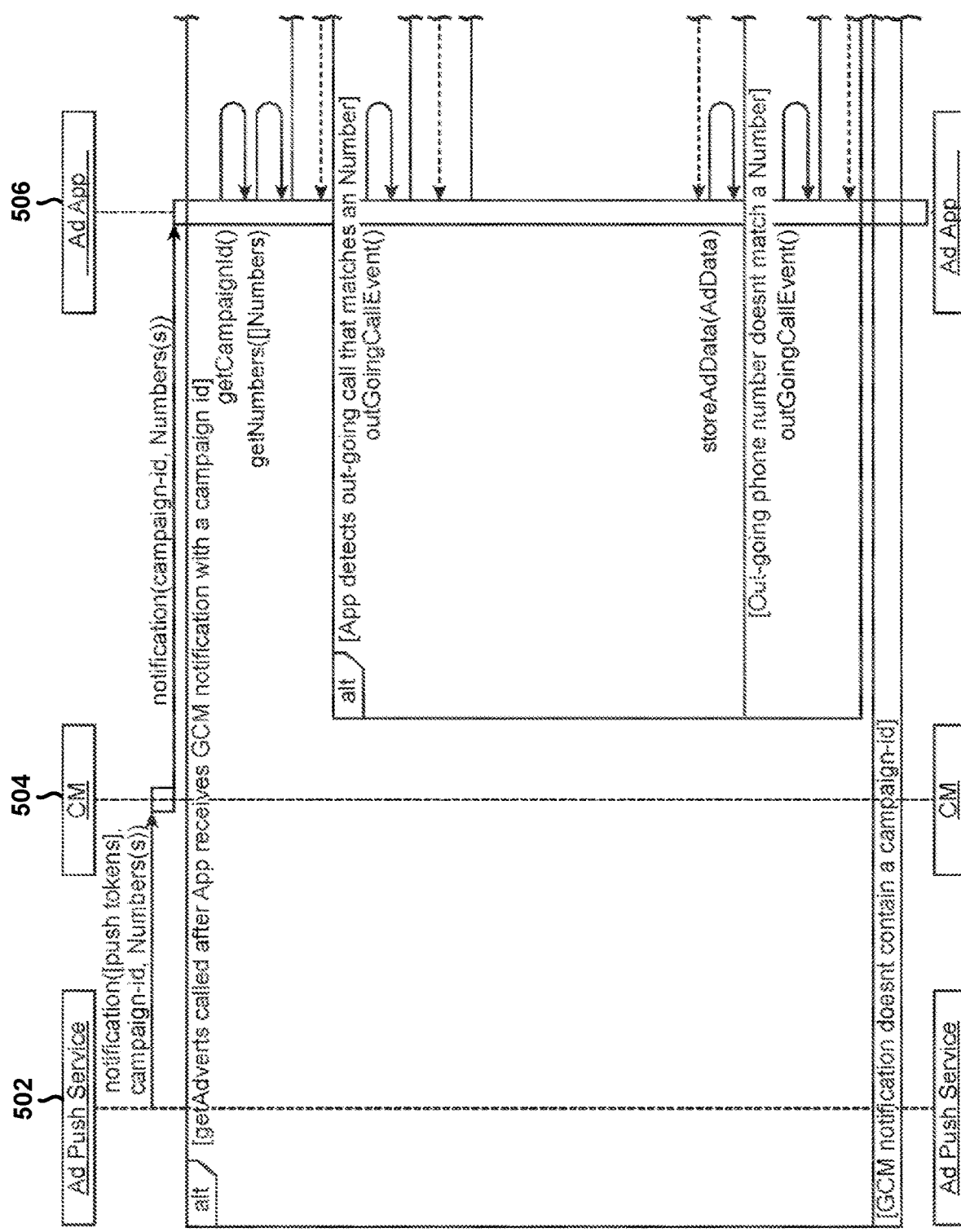
FIG. 5 illustrates an embodiment for a method of retrieving a telephone number campaign from a server via a cloud messaging notification.
Figure 5:
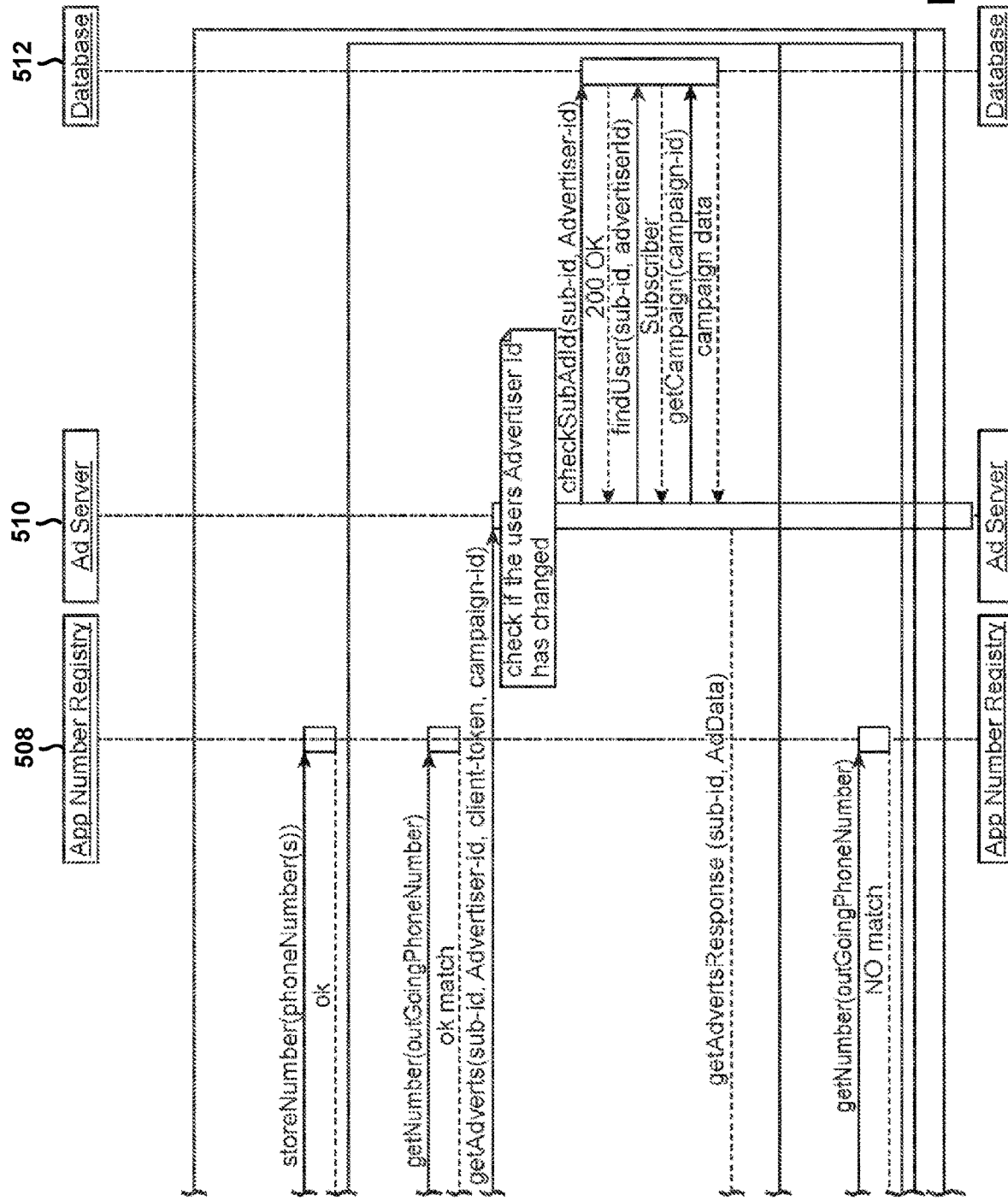

An embodiment for a method of retrieving a telephone number campaign from a server via a cloud messaging notification is illustrated in FIG. 5. The ad push service 502 may send a batch notification message to the CM 504 service with the campaign-id, list numbers of the new telephone number triggered campaign and the subscriber push tokens. The CM 504 service may send the notification to the ad app 506 and/or all clients that a push token provided by the ad push service 502. The ad app 506 may receive the notification from the CM 504 service and parse the campaign-id and list of numbers from the message. The ad app 506 may store the list of numbers in the app number registry 508. The ad app 506 may wait for an outgoing call to be made by the user and check whether the phone number matches any of the numbers stored in the app number registry 508. If it finds a match, the ad app 506 may call the ad server 510 to download the ad campaign using the ad campaign-id from the push notification. The ad server 510 may query a database 512 to check that the device's advertiser-id hasn't changed from the last received getAdverts( ) API call to the server from this device. An engine service (e.g., ad campaign engine 406 illustrated in FIG. 4) may look up the user and check that it is eligible to receive the ad campaign. The engine service may send the ad data back to the device (this may contain a Uniform Resource Locator (URL) link to the campaign media). The app may download the ad media file(s) using the returned URL from the ad metadata and store the data into its local cache. In an embodiment, ads may be displayed in real-time based on network conditions, for example, if the client is connected to a 4G/LTE cellular network.

Figure 6:
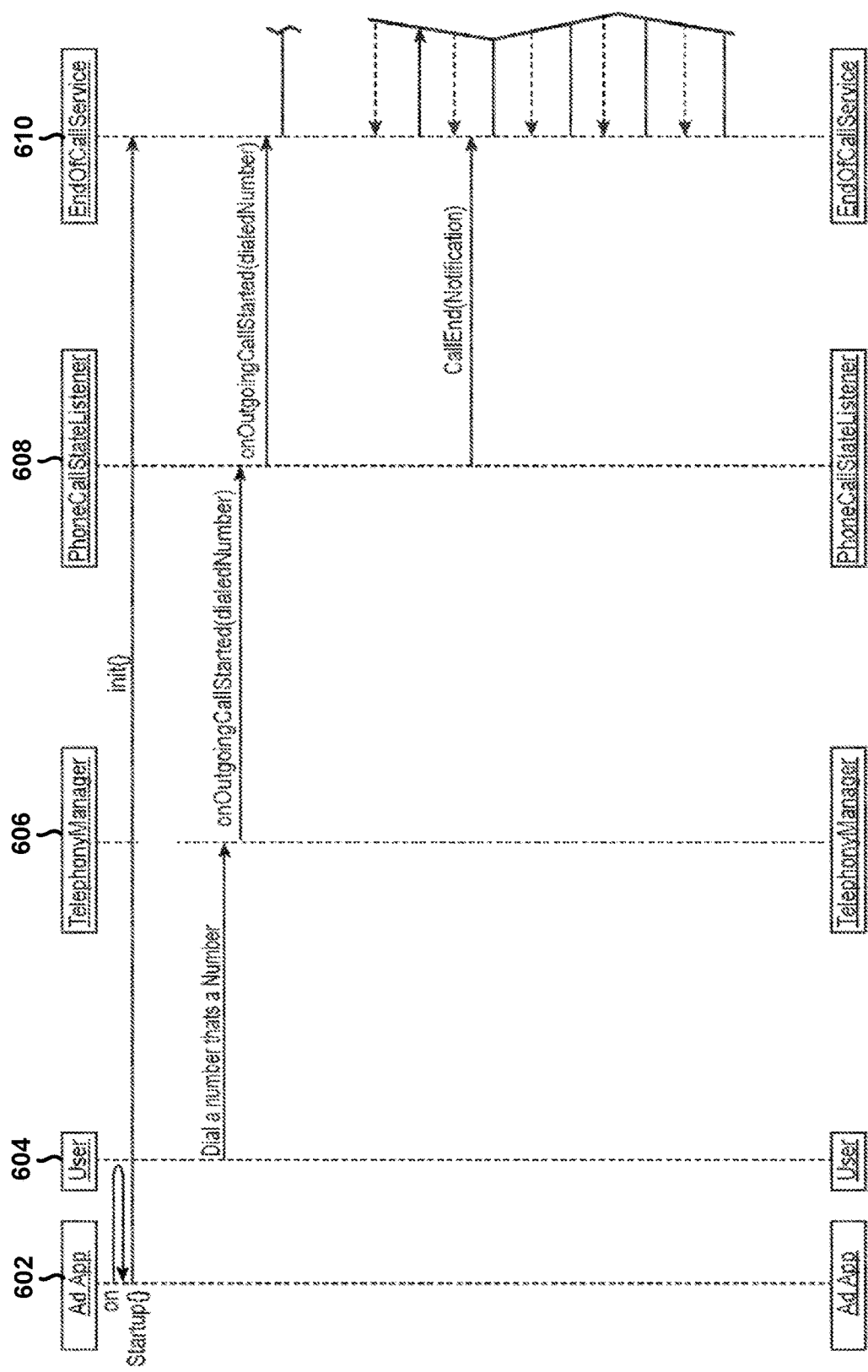
FIG. 6 illustrates an embodiment for a method to display an advertisement after an end-of-call event.
Figure 6:
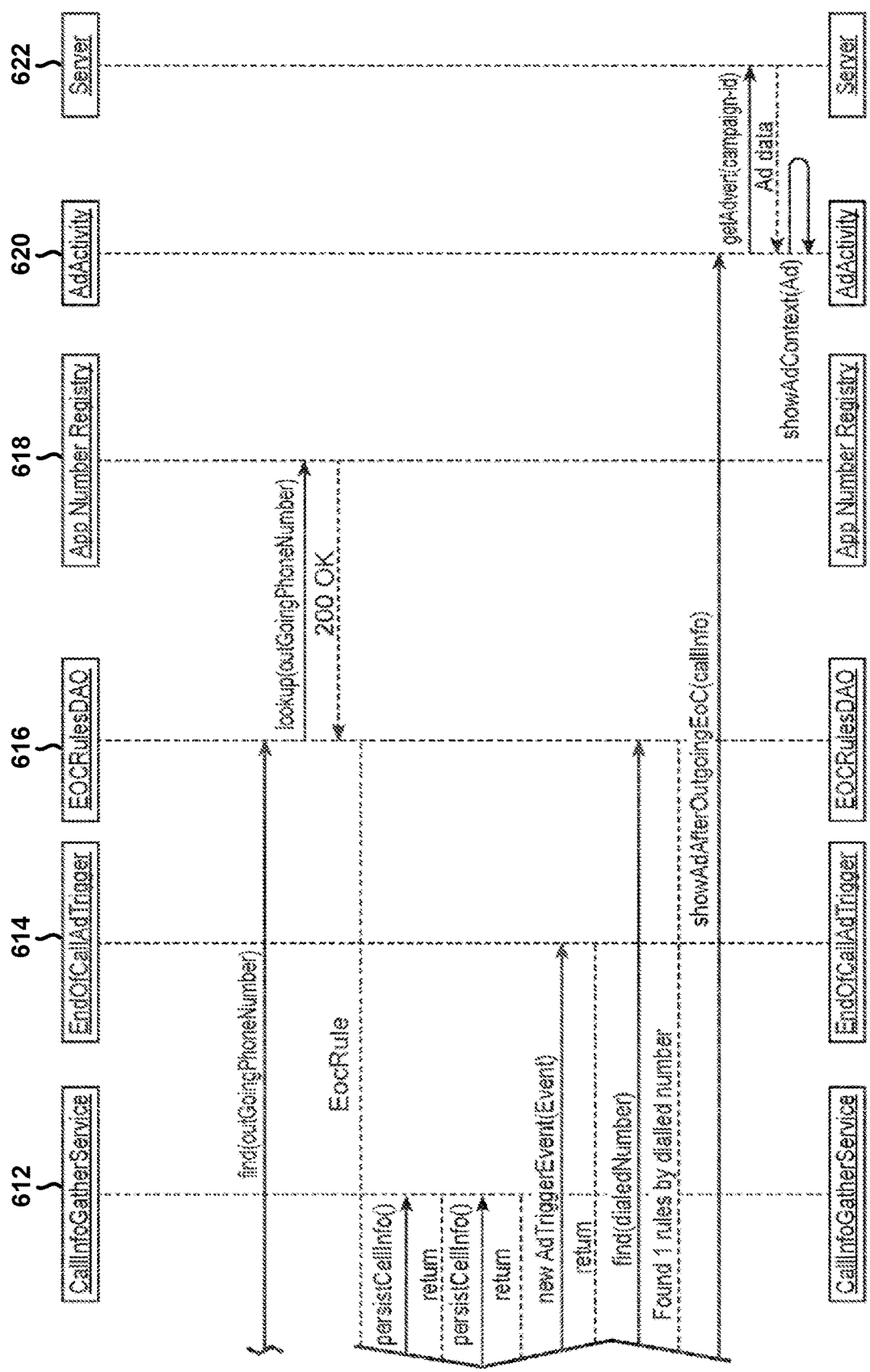

An embodiment for a method to display an advertisement after an end-of-call event is illustrated in FIG. 6. In the example illustrated in FIG. 6, the system includes an ad app 602, user 604, TelephonyManager 606, PhoneCallStatListener 608, EndOfCallService 610 component, CallInfoGatherService 612, EndofCallAdTrigger 614, EOCRulesDAO 616, app number registry 618, AdActivity 620, and a server 622. A subscriber (e.g., user 604 in FIG. 6) may dial a phone number on the mobile device using the dialer application. The mobile device's TelephonyManager 606 may connect the call to the carrier's mobile network. The ad app 602 or SDK may receive a notification from the operating system (OS) that a call has begun from the device. The ad app 602 may retrieve the outgoing phone number from the operating system API. The ad app 602 or SDK may use this retrieved phone number to check whether the number exists in the applications 'app number registry' (ANR) 618. If the phone number exists in the app number registry 618, the app may return an EocRule object to the EndOfCall Service class. The EndOfCallService class calls the AdActivity class after detecting the call end event from the OS. The AdActivity 620 component may select the correct Ad to display based on the telephone number trigger and ad display rules algorithm. The Ad may be displayed after the call terminates on the mobile device.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described.

Embodiments of the invention may also relate to an apparatus or system for performing the operations herein. This apparatus or system may be specially constructed for the required purposes, and/or it may include a general-purpose computing device selectively activated or reconfigured by a computer program stored in a computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The various components depicted in FIGS. 2 and 3 may include computing devices or reside on computing devices such as servers, desktop computers, laptop computers, tablet computers, personal digital assistants (PDA), smartphones, mobile phones, smart devices, appliances, sensors, or the like. Computing devices may include processors, memories, network interfaces, peripheral interfaces, and the like. Some or all of the components may include or reside on separate computing devices. Some or all of the components depicted may include or reside on the same computing device.

The various components in FIGS. 2 and 3 may be configured to communicate directly or indirectly with a wireless network such as through a base station, a router, switch, or other computing devices. In an embodiment, the components may be configured to utilize various communication protocols such as Global System for Mobile Communications (GSM), General Packet Radio Services (GPRS), Enhanced Data GSM Environment (EDGE), Code Division Multiple Access (CDMA), Wideband Code Division Multiple Access (WCDMA), Bluetooth, High Speed Packet Access (HSPA), Long Term Evolution (LTE), and Worldwide Interoperability for Microwave Access (WiMAX).

The components may be further configured to utilize user datagram protocol transport control protocol (TCP), satellite links and various other communication protocols, technologies, or methods. Additionally, the components may be configured to connect to an electronic network without communicating through a wireless network. The components may be configured to utilize analog telephone lines (dial-up connection), digital lines (T1, T2, T3, T4, or the like), Digital Subscriber lines (DSL), Ethernet, or the like. It is further contemplated that the components may be connected directly to a computing device through a Universal Serial Bus (USB) port, Bluetooth, infrared (IR), Firewire port, thunderbolt port, ad-hoc wireless connection, or the like. Components may be configured to send, receive, and/or manage messages such as email, SMS, MMS, or the like.

As discussed above, the embodiments may include methods, and devices configured to implement the methods, for displaying media on a mobile device (e.g., smartphone, etc.) that include determining (e.g., by the mobile device, a processor of the mobile device, a server computing device, etc.) that a telephone call has been initiated between the mobile device and a second telephone device, determining a telephone number of the second telephone device, determining that the telephone number of the second telephone device matches a campaign telephone number stored in memory, determining a media object to display based on the telephone number, downloading the media object on the mobile device, determining that the telephone call has ended, and displaying the media object on the mobile device after the telephone call has ended.

As also discussed above, some embodiments may include registering a mobile device to an identity service associated with a server computing device implementing a media delivery platform, acquiring by the mobile device authentication tokens through the identity service (in which the identity service provides an API to the mobile device for acquiring the authentication tokens), sending by the mobile device the authentication tokens to the server computing device for authenticating registration with the identity service, receiving at the registered mobile device notifications that include information related to new campaigns to automatically update campaign telephone numbers stored in the mobile device (in which the information includes new campaign IDs and a list of associated campaign telephone numbers used to trigger display of media objects), determining (e.g., by the mobile device, a processor of the mobile device, a server computing device, etc.) that a telephone call has been initiated between the mobile device and a second telephone device, determining a telephone number of the second telephone device, determining that the telephone number of the second telephone device matches a campaign telephone number stored in memory, determining a media object to display based on the telephone number, downloading the media object, determining by the mobile device that the telephone call has ended, and displaying the media object on the mobile device after the telephone call has ended.

Further embodiments may include methods of reducing calls to a customer service center of an enterprise (e.g., the telecommunications service provider, etc.). A mobile device may be configured to monitor the activities of a mobile device user to determine whether the mobile device user has commenced calling the customer service center (e.g., or that a telephone call has been initiated between the mobile device and a second telephone device) and/or to determine whether there is a high probability that the mobile device user will commence calling the customer service center in the near future. The mobile device may analyse the user's activities and/or use information received from a server device to predict the reasons that the mobile device user has commenced calling customer service center or will commence calling the customer service center in the near future. To accomplish this, the mobile device may use any of a variety of prediction techniques known in the computing arts, such as statistical modelling, case-based reasoning, lazy learners, Bayesian classifiers, distributed voting, reinforcement learning, fuzzy rule-based learning, adaptive fuzzy inference, and mixture-model techniques. The mobile device may select one or more of the predicted reasons, select a media object/element based on the selected/predicted reason(s), and render the selected media element front and center on a screen of the mobile device, on top of any other content displayed on the screen, until the user interacts with the mobile device or until the media object/element has been rendered for a predefined time period.

Telecommunication service providers now offer their customer access to a wide variety of different services and subscription plans (e.g., pre-paid subscription plans, post-paid subscription plans, multi-user subscription plans, usage-limited subscription plans, etc.). The proliferation of these new services and subscription plans has increased the complexity of using mobile devices and managing subscriber accounts. To help customers manage this complexity, telecommunications service providers now also provide their customers access to apps and other web-based systems that allow mobile device users to look up information and self-manage their accounts. For example, mobile device users may download and use an operator app (e.g., MyVerizion App, MyATT App, etc.) to check the health or functioning of the mobile device, monitor data usage, change subscription plans or service levels (e.g., Gold, Bronze, etc.), pay a monthly bill, purchase additional data, and accomplish other similar tasks via their mobile devices.

Despite the availability of operator apps and web-based systems that provide mobile device users with robust access and control over their accounts, customers continue to rely on human operators and/or customer service centers of telecommunication service providers to accomplish many tasks. For example, despite online payment systems that allow mobile device users to pay their bills faster and more efficiently than traditional phone-based or voice-based systems, many subscribers still choose to call the customer service department each month to submit their payment over a voice call. Due to such customer behaviours and habits, many telecommunications service providers are forced to utilize expensive customer service vendors and/or maintain robust customer service departments that use human or labour-intensive procedures to interact with the customers (e.g., answer their questions, manage their accounts, etc). These customer service centers/venders could contribute significantly to the overhead/operating expenses of an enterprise (e.g., telecommunication service providers, etc.) and/or prevent them from offering their customers with additional or less expensive services or subscription plans.

To improve the user experience and reduce overhead/operating costs, some enterprises (e.g., telecommunication service providers, etc.) have begun sending notification messages to their customers to inform them of the availability and/or capabilities of web-based access or control mechanisms (e.g., operator apps, self-care apps, etc.). However, the engagement rates associated with these conventional notification messages have been extremely low (~1-2%). That is, most customers (e.g., ~98-99%) do not read the notification messages, do not click on links included in the messages, do not respond to the messages, or do not otherwise alter their behaviors or habits based on the content included in the conventional notification messages sent by such enterprises. Due to these low response/engagement rates, enterprises such as telecommunication service providers have not been successful in encouraging mobile device users to better utilize the capabilities of their apps and web-based tools. Because they are not fully utilized, the creation/deployment of such tools has not significantly reduced the number of calls to the customer service centers or the average duration of such calls. Many such enterprises are still forced to utilize expensive customer service vendors and/or maintain robust customer service departments that use human or labour-intensive procedures.

The low response/engagement rates associated with conventional notification messages could be due to any or all of a variety of factors, including the timing associated with when the notification message is displayed to the mobile device user, the content included in notification message, the location/position on the mobile device screen in which the notification message is displayed, and the technology used to communicate the notification messages. For example, using conventional solutions, mobile device users could receive notification messages at random times or when they are focused on other tasks. As a result, mobile device users may ignore or forget about the notification messages. In addition, notifications that are sent via short message service (SMS), email, or other similar technologies may require that the mobile device user further engage with the device or perform other actions (e.g., open a specific app, etc.), which when focused on other tasks, many mobile device users simply choose not to perform. As another example, notification messages that are sent as push notifications could be added to a long list of push notifications from other apps, which many customers view as a nuisance or have developed a habit to ignore. For these and other reasons, conventional notification messages sent by certain enterprises, such as telecommunication service providers, to their customers have not be successful in altering user behaviors/habits, have not adequately reduced customer calls to customer service centers, have not reduced the average durations of customer service calls, and thus have not allowed the enterprises to reduce the overhead/operating expenses associated with managing or maintaining customer service centers.

The embodiments include components that overcome the above-described limitations of conventional solutions to allow such enterprises (e.g., telecommunication service providers, etc.) to better engage and interact with their customers, increase the response/engagement rates associated with the enterprise communications, alter existing user behaviors/habits, redirect mobile device users from calling the customer service center to using a web-based access or control mechanism (e.g., operator apps, etc.) to trouble-shoot their own devices or self-manage their own accounts, reduce customer calls to customer service centers, reduce the average durations of customer calls to customer service centers, and/or otherwise reduce the overhead/operating expenses associated with managing or maintaining customer service centers so as to allow the enterprises to offer additional or more cost-effective services (e.g., subscription plans, etc.) to their customers.

In some embodiments, one or more components (e.g., mobile device, server device, etc.) may be configured to use the mobile device's usage history, subscriber account information, artificial intelligence, machine learning, heuristics and/or other similar information, techniques or technologies to intelligently determine the motives or reasons (and probabilities for the motives/reasons) that a mobile device user would contact a customer service center of a telecommunication service provider. For example, if the mobile device's usage history indicates that the mobile device user has contacted the customer service center each month for the past three months shortly after receiving a bill (e.g., 3-4 days after the bill is issued, etc.) to submit payment, a device processor (e.g., a processor in the mobile device or a server processor) may determine that the there is a high probability that the mobile device user will contact the customer service center immediately after the next bill to submit payment.

The components may monitor the actions or behaviours of the mobile device user to determine whether the mobile device user is calling (or is about to call/contact) a customer service center. The components may use the determined motives/reasons and their associated probability values to select a media element (e.g., image, video, text, links, etc.) and cause the user mobile device to render the selected media element on the mobile device screen in response to determining that the mobile device user is calling or is about to call the customer service center. The components may render the selected media element front and center on the screen, on top of all other content displayed on that screen, until the user interacts with the mobile device or the rendered media element.

As a more detailed example, in some embodiments, a mobile device processor may be configured to redirect calls made to a customer service center of an enterprise by monitoring the actions or behaviours of the mobile device user to determine that mobile device user has opened a voice-based calling app on the mobile device or has begun dialling the phone number of a customer service center. The mobile device processor may also determine the motives or reasons (and probabilities for the motives/reasons) that the mobile device user would contact the customer service center. The mobile device processor may determine, based on the mobile device's usage history, determined motives/reasons, analysis results, and/or information received from a server computing device, that there is a high probability that the mobile device user intends to contact the customer service center to submit payment for a recent bill. In response, the mobile device processor may select a media element that includes hyperlinks or other interactive elements that allow the mobile device user to download and use an operator app to submit the payment electronically, and render the selected media element front and center on the screen, on top of all other content, until the user closes rendered media element or clicks on one of its interactive elements to download or use the operator app to submit payment.

By intelligently generating or selecting the media element to include content that is relevant to an action or task in which the mobile device user is either currently performing or likely to perform in the near future, and rendering the selected the media element front and center on the screen, on top of all other content, until the user interacts with rendered media element, the embodiments may significantly increase the response/engagement rates associated with the telecommunication service provider communications and/or significantly reduce the number and/or average duration of customer calls to customer service centers. By reducing the number calls to customer service centers and/or reducing the average durations of such calls, the various embodiments may reduce the overhead/operating expenses of enterprises and/or allow an enterprise to offer its customers with additional or less expensive services.

In some embodiments, the components may be configured to select and render media elements proactively, reactively, and/or in real-time. For example, a mobile device processor may be configured to send location information identifying the location of the mobile device to the server computing device. A processor in the server computing device may determine that the mobile device is currently located in an area that is subject to a severe weather warning (e.g., area expected to be hit by a hurricane, etc.) or potential network outage. In response, the server computing device may proactively determine that there is a high probability that the mobile device user will contact the customer service center to seek information regarding the device's service/coverage during a severe weather event (and/or in relation to an existing or potential network outage), select a media element that includes hyperlinks or other interactive elements, and cause the mobile device to render the selected media element front and center on the screen, on top of all other content. As examples, the server may generate and send a campaign to the mobile device that causes the mobile device to render media elements that identify the service/coverage policies relevant to that device during the severe weather event, that identify special polices put in place by the service provider during the severe weather event (e.g., data relief and free voice calls for the period of emergency, network outage policies or warnings, etc.), include links to download and install an operator app on the device, or other similar information or interactive elements. Unlike conventional push notifications, the media element may be displayed front and center on the mobile device's screen, on top of all other content, when the user is engaged with the mobile device and/or conducting an activity or task that is relevant to the content of the media element.

As another example, the device processor may proactively determine that there is a high probability that the mobile device user will contact the customer service center to seek information (e.g., regarding a bill, available packages, etc.) in response to the device processor (or a server processor) determining that the mobile device is currently located in an area that is outside the geographical range of its home network (or is currently roaming), that the mobile device is not currently subscribed to a roaming package, and/or that mobile device user has opened a voice-based calling app on the mobile device or has begun dialling the phone number of a customer service center. That is, embedded wireless modem cards often tie the mobile device a specific telecommunication service provider (e.g., AT&T, Verizon, etc.) by requiring that the mobile device connect to the global telecommunications network (and ultimately the Internet) through that service provider's cellular network ("home network"). When a connection through the home network is not available, such as when the mobile device is outside the geographical range of its home network, the mobile device may be allowed to "roam" by connecting through a different service provider's cellular network ("visited network"). While such roaming capability may provide a mobile device user with added mobility and connectivity, it is often much more expensive than accessing wireless IP and data services over the mobile device's home network. To avoid to receiving a flood of calls regarding the added expenses associated with roaming, the device/server processor may proactively identify the services or plans that are available to the mobile device user and which could reduce roaming costs (e.g., in response to determining that the device is currently roaming, that the mobile device is not currently subscribed to a roaming package, etc.). The processor may include information or links relevant to the identified services or plans in a campaign or media element (including links to download and install an operator app on the device if needed), and cause the mobile device to display the media element (e.g., when the user is engaged with the mobile device, conducting an activity or task that is relevant to the content of the media element, etc.). When the user interacts with the media element, the mobile device may redirect the user from calling the customer service center to reading the relevant information online or self-servicing his or her account.

As yet another example, a device processor may be configured to monitor prepaid data usage on the mobile device and determine the amount of data remaining in the mobile device user's account. The device processor may also analyse the mobile device's usage history to determine whether the mobile device user has a habit of contacting the customer service center for information or to top-up credit or prepaid data. The device processor may determine that the rate of data usage has increased significantly in the past few days, that the user is likely to run out of credit or prepaid data soon, that the user has a habit of contacting the customer service center for information or to top-up credit or prepaid data, and/or that mobile device user has opened a voice-based calling app on the mobile device or has begun dialling the phone number of a customer service center. Based on these and/or other observations and analysis, the device processor may determine that there is a high probability that the mobile device user will contact the customer service center to purchase additional data or request information regarding the increased data usage on the mobile device. In response, the processor may select a media element that lists, categorizes or itemizes data usage on the device over the past few days and/or includes a link to top-up or purchase additional data via the operator app.

In some embodiments the device processor may be configured to redirect calls made to a customer service center of an enterprise based on call volume or characteristics of the customer service center. For example, the device processor may monitor the actions or behaviours of the mobile device user to determine that mobile device user has opened a voice-based calling app on the mobile device or has begun dialling the phone number of a customer service center. The device processor (or server processor) may determine values representing call volume, the operational capacity of the customer service center agent (or how busy the agents are, etc.), customer wait times (or the anticipated amount of time before an agent will be available to accept the call, etc.), and/or or similar factors or conditions. The processor may compare the determined values to thresholds, and cause the mobile device to render a selected media element when one or more of the determined values exceed their respective thresholds.

In some embodiments the device processor may be configured to redirect calls made to a customer service center of an enterprise by rendering a media element that allows the user to chat with an agent or bot. For example, the device processor may monitor the actions or behaviours of the mobile device user to determine that mobile device user has opened a voice-based calling app on the mobile device or has begun dialling the phone number of a customer service center. The device processor may also determine or predict the reason for the call (e.g., whether the user has recently received a bill, whether the bill is larger than usual, etc.). The device processor may select a media element based on the determined/predicted reason, and cause the mobile device to render the selected media element. For example, the mobile device may present users with an option which asks them whether they are calling regarding a recent bill, and if they would like to divert to Online Chat (e.g., "if you are calling about your recent bill, click here to chat with an agent").

In some embodiments the device processor may be configured to drive usage of operator apps and web-based systems. For example, the processor may be configured to use machine learning techniques to learn the habits or behaviours of the mobile device user, determine whether the operator app or web-based system of telecommunications service provider includes features that would engage the mobile device user based on the learned habits/behaviours, select a media element that identifies those features, and render the selected media element front and center on the screen, on top of all other content, until the user closes rendered media element or clicks on one of its interactive elements to download or use the operator app for the identified features. By using the learned habits/behaviours to intelligently determine whether the features that would engage the mobile device user, and intelligently selecting and displaying relevant content (e.g., media elements that identify features that would engage the mobile device user) when the user is focused on a relevant task, the embodiments may significantly increase the usage of operator apps and web-based systems to reduce the overhead/operating expenses of enterprises. This reduction in overhead/operating expenses may allow the enterprises to offer their customers with additional or less expensive services or subscription plans.

In some embodiments, the device processor may be configured to select and display the media elements, at least in part, based on a command, message, trigger or instruction message received from the customer service center. In some embodiments the device processor may be configured to reduce the average durations of calls to the customer service centers of an enterprise. For example, if customer service center representative determines that the user has contacted the customer service center to submit payment for a recent bill, the representative may send a message to the device processor that causes the device processor to select and display, during the call, a media element that includes hyperlinks or other interactive elements that allow the user to download and use an operator app to submit payment electronically. The device processor may display the media element in during the call.

Figure 7:
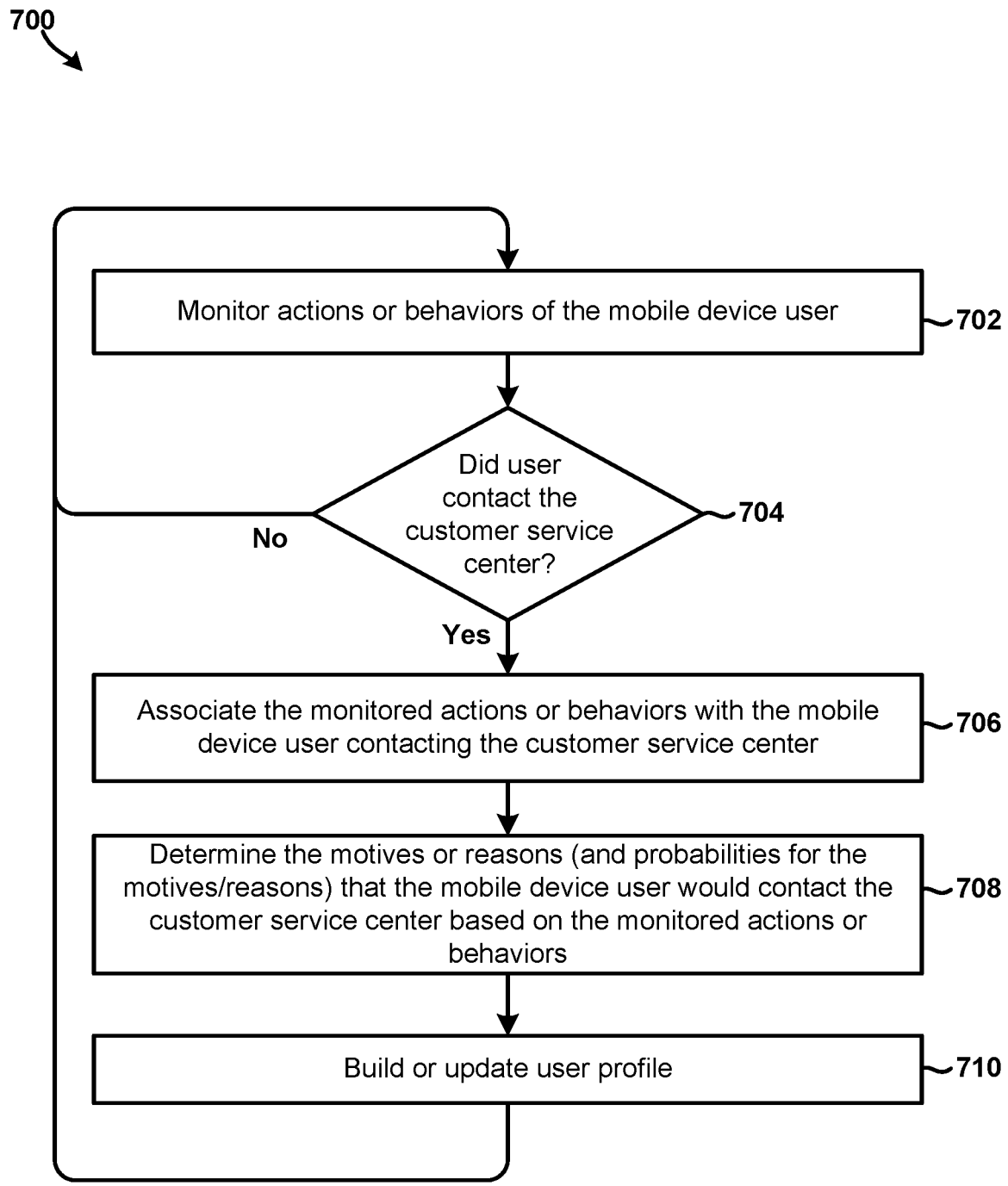
FIGS. 7 and 8 are process flow diagrams illustrating methods of reducing calls to a customer service center of an enterprise (e.g., a telecommunications service provider) in accordance with various embodiments.

FIG. 7 illustrates an example method 700 of building and maintaining a user profile that identifies user actions or behaviors on the mobile device that indicate that the user is likely to contact the customer service center in the near future, or which identify the motives or reasons (and probabilities for the motives/reasons) that the mobile device user would contact the customer service center. All or portions of method 700 may be performed by one or more processors in a server or mobile device.

In block 702, a processor (in a mobile device, in a server device, etc.) may monitor actions or behaviors of the mobile device user, and store information identifying the monitored actions/behaviors in a datastore or memory. For example, the processor may implement, install, monitor various application programming interfaces (APIs), registers, counters, log files or other device components at various levels of the device (e.g., at the hardware level, driver level, kernel level, native development kit (NDK) level, SDK level, and/or Webkit level, etc.), collect behavior information from those components, and store the collected behavior information in the datastore or memory of the mobile device. In addition, the processor may read, monitor, collect or store device identifiers (e.g., IMEI, IMSI, AD-ID), device model information (make, model, etc.), call logs, installed apps, demographic details (e.g., age, gender, location, etc.), geolocation information, and/or any other information available about the subscriber or user device in block 702.

In some embodiments, in block 702, the processor may generate a behavior information structure that characterizes the subscriber, the mobile device user, mobile device, or the monitored actions/behaviors of the mobile device user or mobile device. The behavior information structure may be an array, a multidimensional array, a list, a table, a map, a vector, or any other data structure known in the art. The behavior information structure may characterize the monitored actions/behaviors via a series of fields (e.g., "Subscription Plan," "User Interaction Level" "International Calling," "Short Message Service (SMS) messages sent today," etc.) and corresponding values (e.g., Prepaid, 12, Yes, 10, etc.).

In some embodiments, processor may generate the behavior information structure to store the fields and associated values so that they could be applied to a machine learning classifier model. A machine learning classifier model may be an information structure that includes a plurality of decision nodes (e.g., decision trees, boosted decision stumps, etc.). Each decision node may ask a question or that each evaluate a specific action or behavior of the mobile device user or mobile device, such as is the subscriber's age below forty, has the user sent more than 20 SMS messages today, what is the subscriber's current subscription plan, has subscriber changed subscription plans in the past three months, is subscriber's account current, does subscriber's credit score exceed a threshold value, how many times has the user interacted with the mobile device today, has user spent more than twenty minutes using social media apps on the device today, etc. In some embodiments, each decision node may ask a question or evaluate a condition that results in a numeric value.

As an example, a behavior information structure may include a "User Interaction" field that describes the frequency in which the user interacts with the computing device via its corresponding value (e.g., 12, etc.). The value may be incremented every time an API or command (e.g., View.onTouchEvent( ), View.onKeyDown, View.onKeyUp, etc.) is invoked on the mobile device.

Applying the behavior information structure that includes a "User Interaction" field with a value of "12" to a machine learning classifier model that includes a decision node that evaluates the condition "is the frequency of user interaction over the past 5 minutes greater than 10 per minute" may generate a result that indicates "yes" via a numeric value (e.g., 1 for yes, 0 for no, etc.).

In some embodiments, each decision node may be associated with a weight value that identifies the importance of the answer relative to other answers to other decision nodes. In some embodiments, the processor may be configured to compute a weighted average of the answers from all decision nodes in classifier model, and classify the behavior information structure based on whether the weighted average exceeds a threshold value.

That is, the machine learning classifier model may include multiple decision nodes and each the behavior information structure may include multiple field/value pairs. As such, applying a behavior information structure to a machine learning classifier model may generate a plurality of answers to a plurality of different test conditions. Each of these answers may be represented by a numerical value. The processor may multiply each of these numerical values with their respective weight value to generate a plurality of weighted answers. The processor may then compute or determine a weighted average based on the weighted answers, and compare the computed weighted average to threshold values, such as an upper threshold and a lower threshold.

The processor may use the result of these comparisons to determine whether the activities characterized by the behavior information structure may be classified (e.g., as "is likely to call," "is not likely to call," "is calling to pay a bill,") with a high degree of confidence. For example, if the computed weighted average is "0.90" and an upper threshold value for "is likely to call" is "0.70," the computing device may classify the behavior characterized by the behavior information structure as indicating there is a high probability that the mobile device user will commence calling the customer service center in the near future. This is because the computed weighted average exceeds the upper/high threshold value (i.e., "0.90">"0.70"). Similarly, if the computed weighted average is "0.08" and the lower/low threshold value "is likely to call" is "0.10," the computing device may classify the behavior information structure (and thus the monitored activity/behavior) as indicating with a high degree of confidence that the mobile device user will not commence calling the customer service center in the near future. This is because the computed weighted average exceeds the lower or low threshold value (i.e., "0.08"<"0.10").

The processor may be configured to determine that it cannot classify a behavior with a sufficiently high degree of confidence when the value of the computed weighted average is below the high threshold and above the low threshold value. For example, the processor may determine that the significance of a behavior is indeterminate when the computed weighted average is 0.50, the upper threshold value is 0.90, lower threshold value is 0.10. In response to determining that the significance of behavior is indeterminate, the processor may select a stronger or more robust classifier model (e.g., that includes more decision nodes, decision nodes that ask more focused or detailed questions, etc.) and repeat any or all of the above-described operations to generate additional or different analysis results. The processor may use this new or additional analysis information to determine whether the indeterminate behavior may be classified one way or another with a high degree of confidence. If not, the computing device may repeatedly or continuously perform the above-described operations until it determines that the behavior (or behavior vector) can be classified with a high degree of confidence (e.g., until the weighted average is above the high threshold or below the low threshold, etc.), until a processing or battery consumption threshold is reached, or until the computing device determines that the cause or source of the indeterminate behavior cannot be identified from the use of stronger classifier models or larger behavior information structures.

Returning to FIG. 7, in determination block 704, the processor may determine whether the user recently contacted the customer service center (e.g., in the past hour, day, week, month, six months, etc.). In response to determining that the user has not recently contacted the customer service center (i.e., determination block 704="No"), the processor may discard the previously monitored activities/behaviors, and continue monitoring/storing the actions or behaviors of the mobile device user in block 702.

In response to determining that the user recently contacted the customer service center (i.e., determination block 704="Yes"), the processor may associate the monitored/stored actions or behaviors of the mobile device with the user with contacting the customer service center with in block 706. For example, if mobile device user recently contacted the customer service center after the frequency of user interaction increased to more than 10 per minute, the processor may determine that increased user interaction could be one factor associated with the user contacting the customer service center. In response, the processor may select a new machine learning classifier model or increase a weight value associated with decision nodes that evaluate the frequency of user interaction.

In block 708, the processor may determine the motives or reasons (and probabilities for the motives/reasons) that the mobile device user would contact the customer service center based on the monitored/stored actions or behaviors of the mobile device, the mobile device's usage history, subscriber account information, artificial intelligence, machine learning (e.g., applying behaviour information structures to machine learning classifier models, etc.), heuristics and/or other similar information. For example, the processor may determine that the there is a high probability that the mobile device user will contact the customer service center to pay the next bill if the usage history indicates that the subscriber contacted the customer service center each of the past 3 months shortly after receiving a bill (e.g., 3-4 days after the bill is issued, etc.).

In block 708, the processor may determine the motives or reasons (and probabilities for the motives/reasons) that the mobile device user would contact the customer service center based on the monitored/stored actions or behaviors of the mobile device, the mobile device's usage history, subscriber account information, artificial intelligence, machine learning (e.g., applying behaviour information structures to machine learning classifier models, etc.), heuristics and/or other similar information. For example, the processor may determine that the there is a high probability that the mobile device user will contact the customer service center to pay the next bill if the usage history indicates that the subscriber contacted the customer service center each of the past 3 months shortly after receiving a bill (e.g., 3-4 days after the bill is issued, etc.).

In block 710, the processor may build or update a user profile. The user profile may include information that identifies user actions or behaviours that indicate that the user is about to call the customer service center, the times/dates that user is most likely to contact the customer service center, the actions or task that the user most likely intends to accomplish by contacting the customer service center, the types of interactive media elements with which the user engages, the types of media elements that the user is most likely to engage with, and other similar information. In some embodiments, the processor may build or update the user profile based on information collected on the mobile device, based on the answers generated when applying the behavior information structure to the machine learning classifier model, based on information received from a server computing device, and/or any other technique discussed in this application or known in the art.

Figure 8:
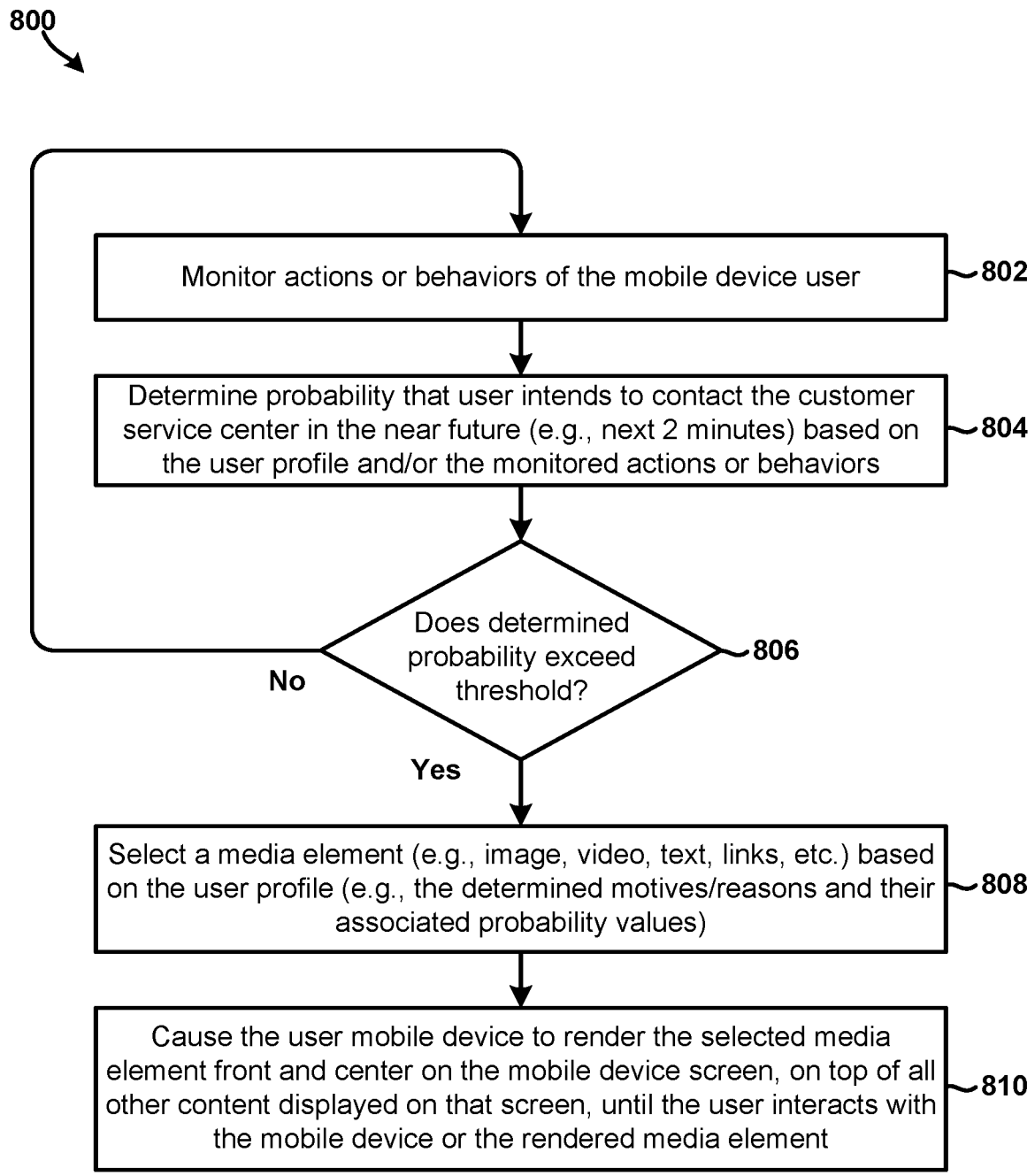

FIG. 8 illustrates a method 800 of redirecting mobile device users from calling the customer service center to using a web-based access and control mechanism (e.g., operator apps, etc.) to trouble-shoot their own devices or self-manage their own accounts in accordance with an embodiment. All or portions of method 800 may be performed by one or more processors in a server or mobile device.

In block 802, a processor may monitor actions or behaviors of the mobile device user, store information identifying the monitored actions/behaviors in a datastore or memory, and/or generate a behavior information structure. In block 804, the processor may determine the probability that user intends to contact the customer service center in the near future (e.g., next 2 minutes, etc.) based on the user profile and/or the monitored actions or behaviors. In some embodiments, the processor may determine the probability that user intends to contact the customer service center based on the results generated by applying the generated behavior information structure to a machine learning classifier model.

In determination block 806, the processor may determine whether the determined probability (i.e., that user intends to contact the customer service center in the near future) exceeds a threshold value. In response to determining that determined probability does not exceed the threshold value (i.e., determination block 806="No"), the processor may select a media element (e.g., image, video, text, links, etc.) based on the user profile built or updated in block 710.

In block 810, the processor may cause the user mobile device to render the selected media element. In some embodiments, the processor may cause the user mobile device to render the selected media element in a manner that captures, focuses or commands the attention of the user. For example, the processor may cause the user mobile device to render the selected media element front and center on the mobile device screen, on top of all other content displayed on that screen, until the user interacts with the mobile device or the rendered media element. As another example, the processor may cause the user mobile device to render the selected media element over user interface elements (e.g., soft keys displayed on the device, etc.) or otherwise in a manner that disables all or a portion of the functions of the device until the user interacts with the displayed media element, etc. It should be understood that in addition to the examples above, the processor may cause the user mobile device to render the selected media element in any way that forces or is likely to cause the mobile device user to read the media element, click on media element, respond to the enterprises, or alter their behavior or habits.

Figure 12:
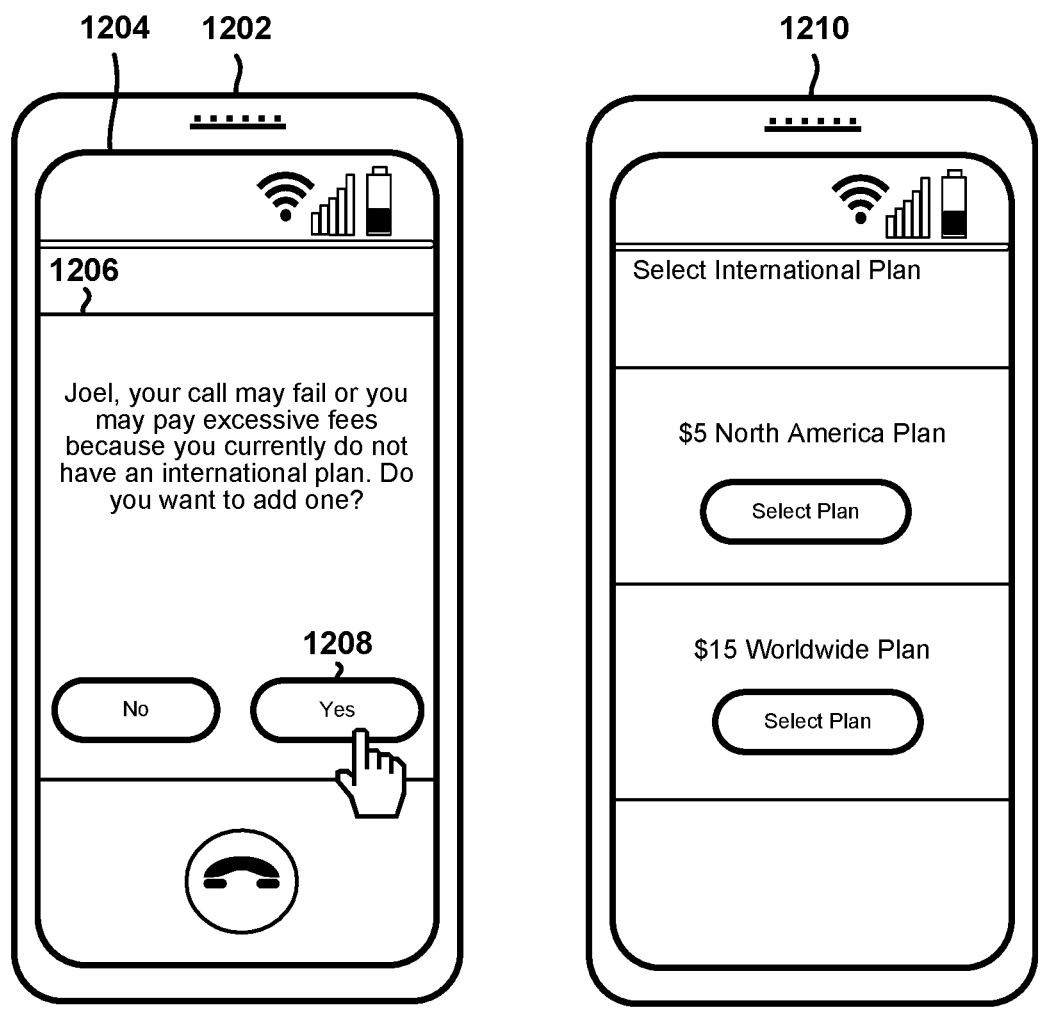
Figure 13:
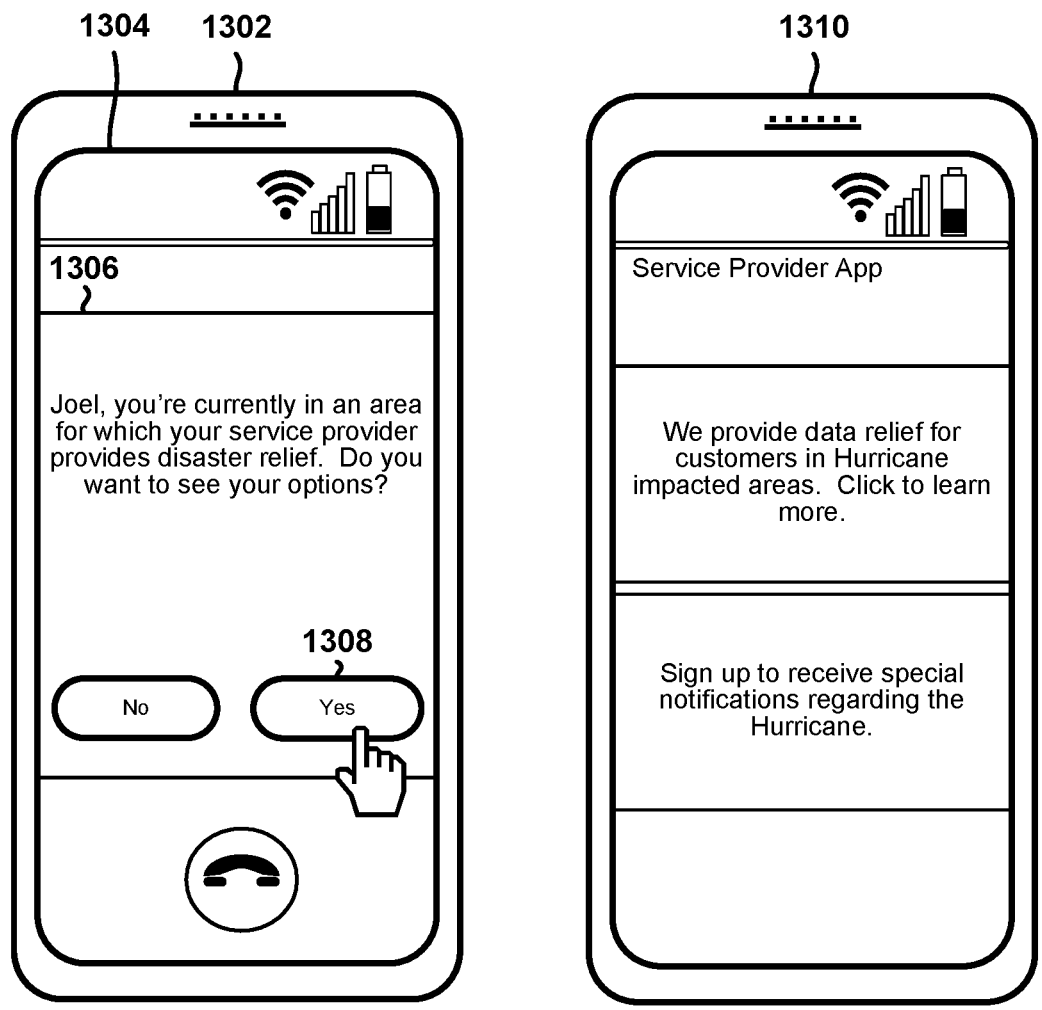
Figure 14:
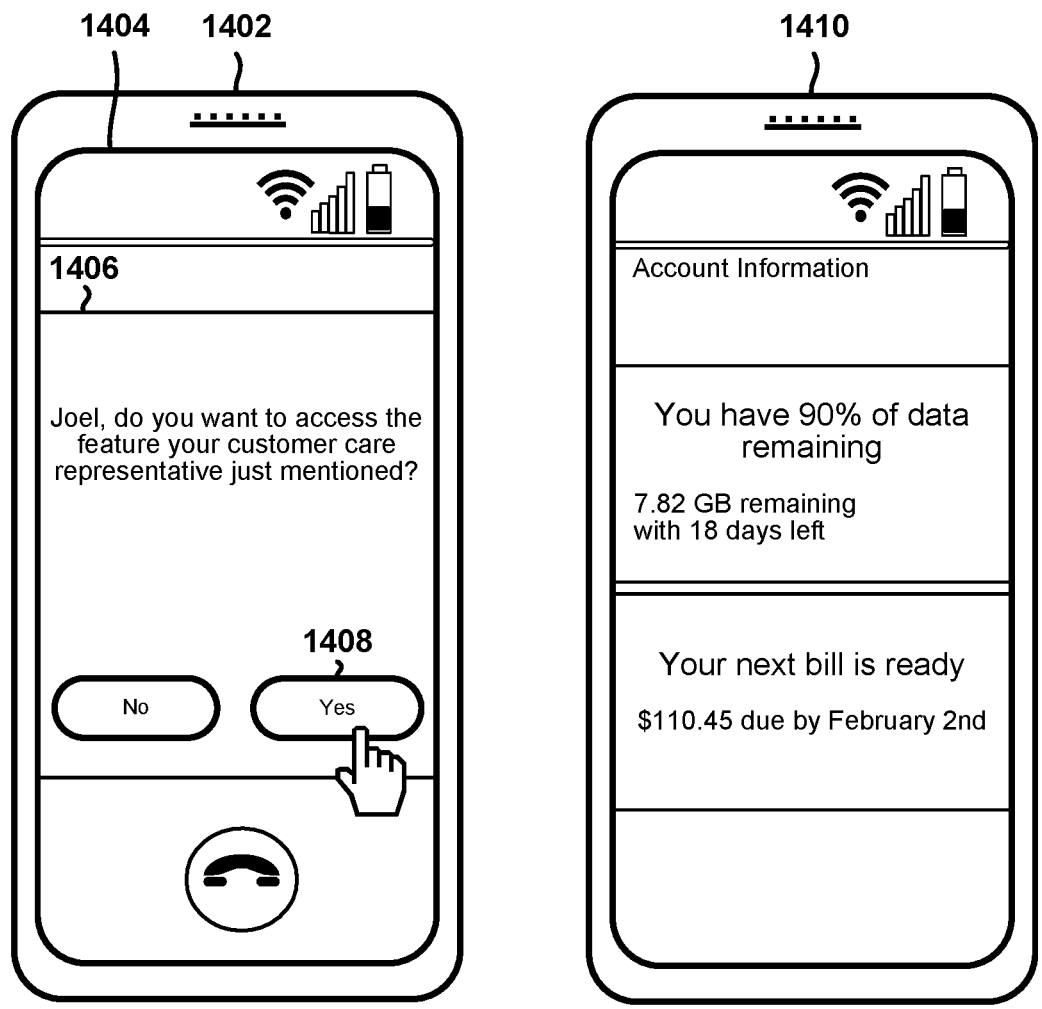
Figure 15:
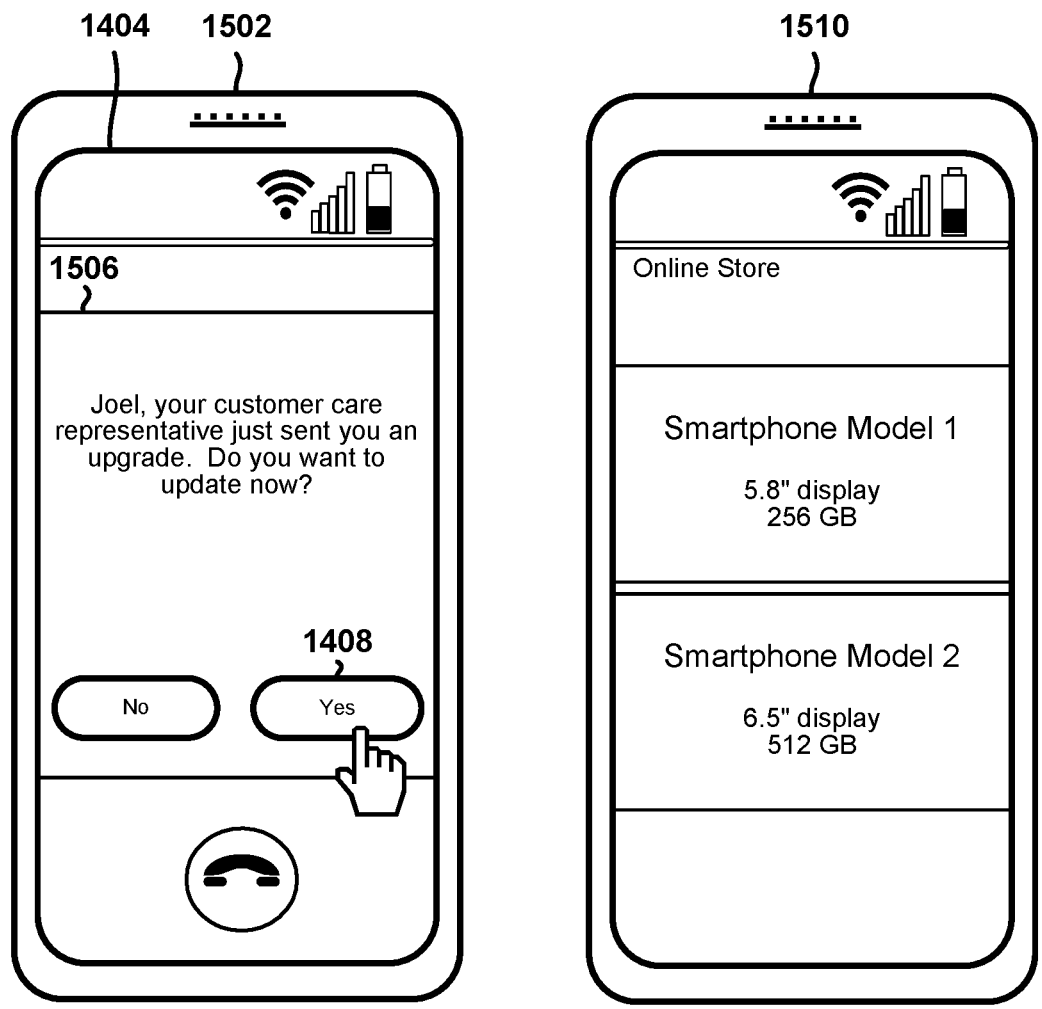

FIGS. 9 through 15 illustrate example user interfaces and user interactions in a mobile device configured to reduce call volume (e.g., the number and/or duration of calls) to customer service center in accordance with some embodiments. In particular, FIGS. 9-13 illustrate example user interfaces and user interactions in a mobile device configured to redirect mobile device users from calling the customer service center to using a web-based access and control mechanism (e.g., operator apps, etc.) to self-manage their own accounts. FIGS. 14 and 15 illustrate example user interfaces and user interactions in a mobile device configured to reduce the duration of calls to the customer service center by redirecting customers that have called the customer service center to using the web-based access and control mechanism (e.g., operator apps, etc.) to self-manage their own accounts.

Figure 9:
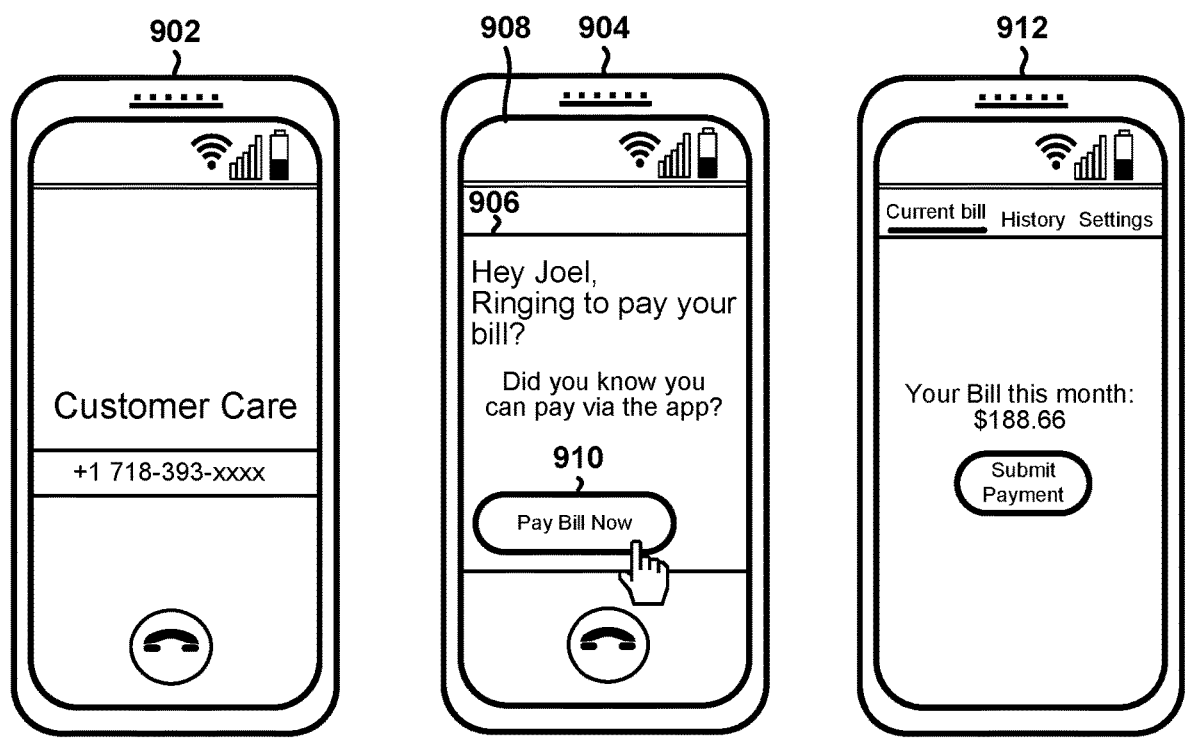
FIGS. 9 through 15 are illustrations of example user interactions and user interfaces of mobile device configured to redirect mobile device users to using a web-based access or control mechanism (e.g., operator apps, etc.) to self-manage their own accounts in accordance with some embodiments.

With reference to FIG. 9, the first user interface 902 illustrates that the user has commenced calling a customer service center associated with the telecommunications service provider. The second user interface 904 illustrates that the mobile device has determined that the user has commenced calling a customer service center associated with the telecommunications service provider, predicted that the mobile device user has commenced calling the customer service center to pay a bill, selected a media element 906 based on the predicted reason, and has rendered the selected media element 906 front and center on a screen 908 of the mobile device, on top of any other content displayed on the screen 908, until the user interacts with the mobile device or the rendered media element 906, such as by clicking on the "pay bill now" button 910. The third user interface 912 illustrates that the mobile device has downloaded and/or launched operator app (e.g., MyVerizion App, MyATT App, etc.), and directed the user to that section of the app that allows the user to pay the bill, in response to determining that the user interacted with the rendered media element 906 (e.g., that the used clicked on the "pay bill now" button 910). That is, the third user interface 912 illustrates that the user has been redirected from calling the customer service center to using a web-based access and control mechanism (e.g., operator apps, etc.) to self-manage the relevant account.

Figure 10:
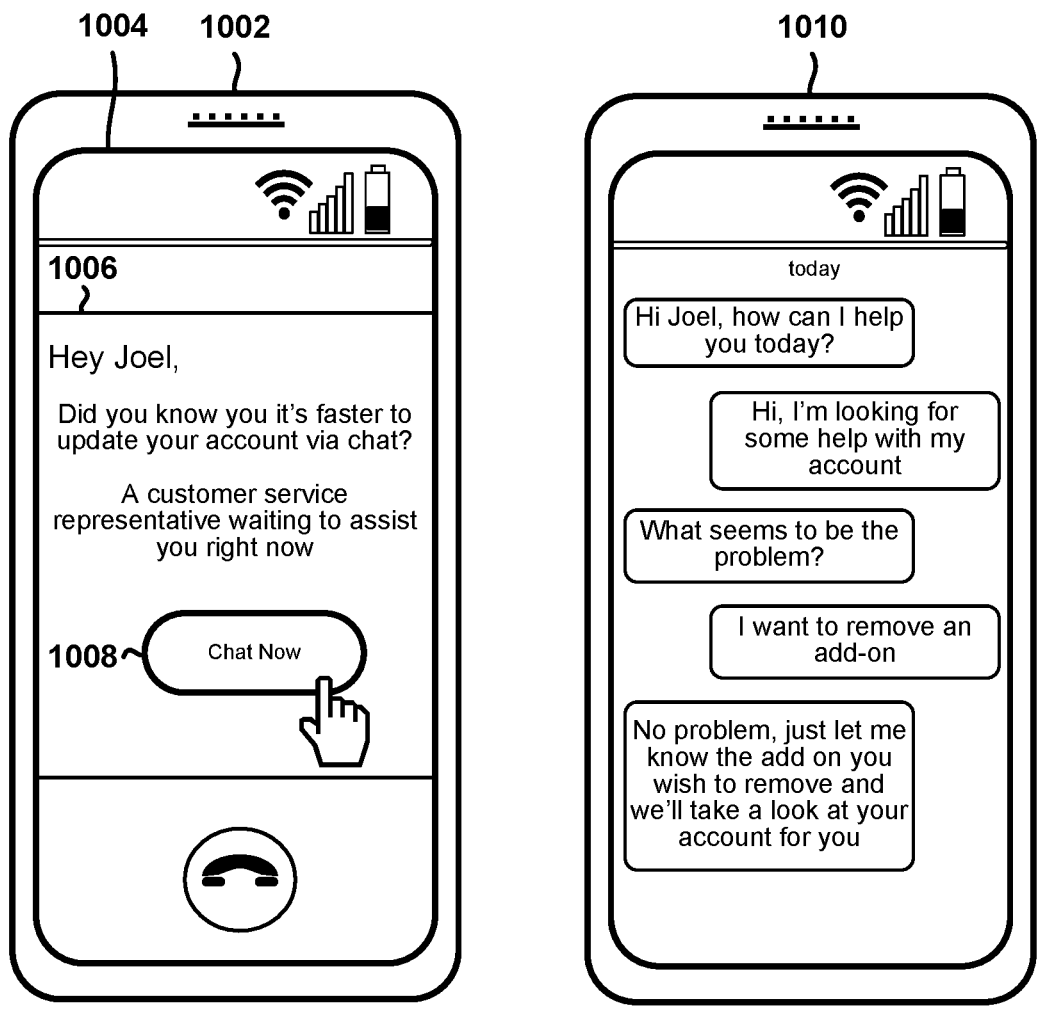

With reference to FIG. 10, the first user interface 1002 illustrates that the mobile device has determined that the user has commenced calling a customer service center associated with the telecommunications service provider, predicted that the mobile device user has commenced calling the customer service center to add or remove an addon (or perform another similar activity that could be address via chat), selected a media element 1006 based on the predicted reason, and has rendered the selected media element 1006 front and center on a screen 1004 of the mobile device, on top of any other content displayed on the screen 1004, until the user interacts with the mobile device or the rendered media element 1006, such as by clicking on the illustrated "chat now" button 1008. The second user interface 1010 illustrates that the mobile device has downloaded and/or launched operator app, and directed the user to use a specific feature of that app (i.e., chat), in response to determining that the user interacted with the rendered media element 1006 (e.g., that the used clicked on the "chat now" button 1008). As such, the second user interface 1010 illustrates that the user has been redirected from calling the customer service center to using a chat service to add or remove an addon (or perform another similar activity that could be address via chat).

Figure 11:
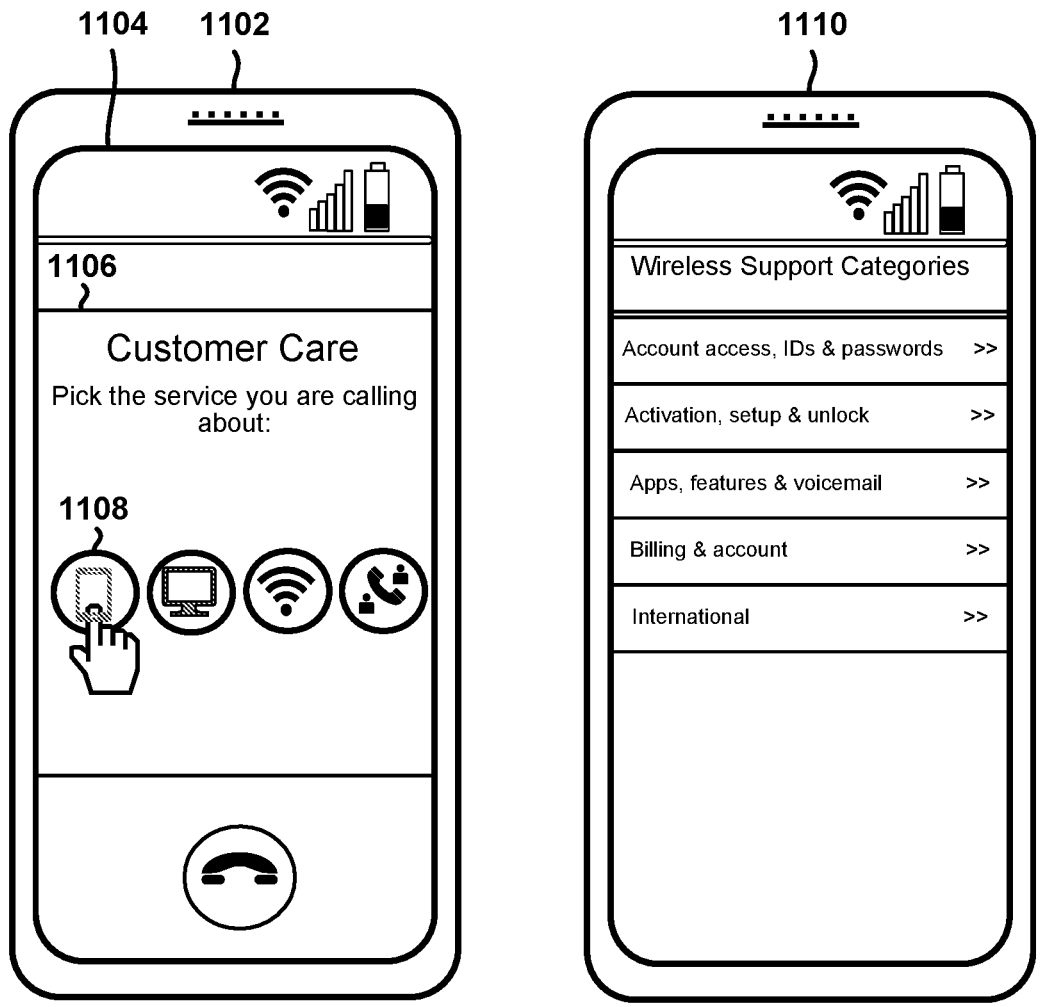

With reference to FIG. 11, the first user interface 1102 illustrates that the mobile device has determined that the user has commenced calling a customer service center associated with the telecommunications service provider, predicted that the mobile device user has commenced calling the customer service center for one of four broad reasons, selected a media element 1106 based on the predicted reasons, and has rendered the selected media element 1106 front and center on a screen 1104 of the mobile device, on top of any other content displayed on the screen 1104, until the user interacts with the mobile device or the rendered media element 1106, such as by clicking on the illustrated "mobile device" button 1108. The second user interface 1110 illustrates that the mobile device has downloaded and/or launched operator app, and directed the user to use a specific submenu of that app (i.e., wireless support categories), in response to determining that the user interacted with the rendered media element 1106 by clicking on the "mobile device" button 1108. As such, the second user interface 1110 illustrates that the user has been redirected from calling the customer service center to a specific submenu that includes options that allow the user to self-manage his or her account.

With reference to FIG. 12, the first user interface 1202 illustrates that the mobile device has determined that the user has commenced calling an international number, determined that the subscriber is not currently subscribed to an international calling plan, predicted that the mobile device user is likely to call the customer service center in the near future to ask about excessive charges or why the call failed, selected a media element 1206 based on the predicted reasons, and has rendered the selected media element 1206 front and center on a screen 1204 of the mobile device, on top of any other content displayed on the screen 1204, until the user interacts with the mobile device or the rendered media element 1206, such as by clicking on the illustrated "Yes" button 1208. The second user interface 1210 illustrates that the mobile device has downloaded and/or launched operator app, and directed the user to use a specific portion of the app that allows the user to purchase an international plan online, in response to determining that the user interacted with the rendered media element 1206 by clicking on the "Yes" button 1208. That is, the second user interface 1210 illustrates that the user has been redirected from calling the customer service center to using a specific portion of an app that allows the user to self-manage his or her account (e.g., by purchasing an international plan online, etc.).

With reference to FIG. 13, the first user interface 1302 illustrates that the mobile device has determined that the user is currently within a geographic area for which the telecommunications service provider provides disaster relief, and predicted that the user is likely to call the customer service center in the near future to ask about service disruption or the options available to the user, selected a media element 1306 based on the predicted reasons, and has rendered the selected media element 1306 front and center on a screen 1304 until the user interacts with the mobile device or the rendered media element 1306, such as by clicking on the illustrated "Yes" button 1308. The second user interface 1310 illustrates that the mobile device has downloaded and/or launched operator app, and directed the user to a specific portion of the app that provides the information and options relevant to the user. For example, second user interface 1310 indicates that the service provider provides disaster relief in the form of data relief for customers in hurricane impacted areas, and allows the user to sign up to receive special notifications.

With reference to FIGS. 14 and 15, first user interfaces 1402 and 1502 illustrate that the mobile device has selected a media element 1406, 1506 based on a message, trigger or instruction received from the customer service center with which the user is currently engaged (e.g., via an established voice call, text messages, etc.), and has rendered the selected media element 1406, 1506, front and center on a screen 1404 of the mobile device, on top of any other content displayed on the screen 1404, until the user interacts with the mobile device or the rendered media element 1406, 1506, such as by clicking on the illustrated "Yes" button 1408. The second user interfaces 1410 and 1510 illustrate that the mobile device has downloaded and/or launched operator app, and directed the user to specific portions of the app. In the example illustrated in FIG. 14, the user has been directed to a specific portion of the app that displays account information (e.g., amount of data remaining, next billing cycle, etc.). In the example illustrated in FIG. 15, the user has been directed to a specific portion of the app that allows eligible users to upgrade their devices.

Figure 16:
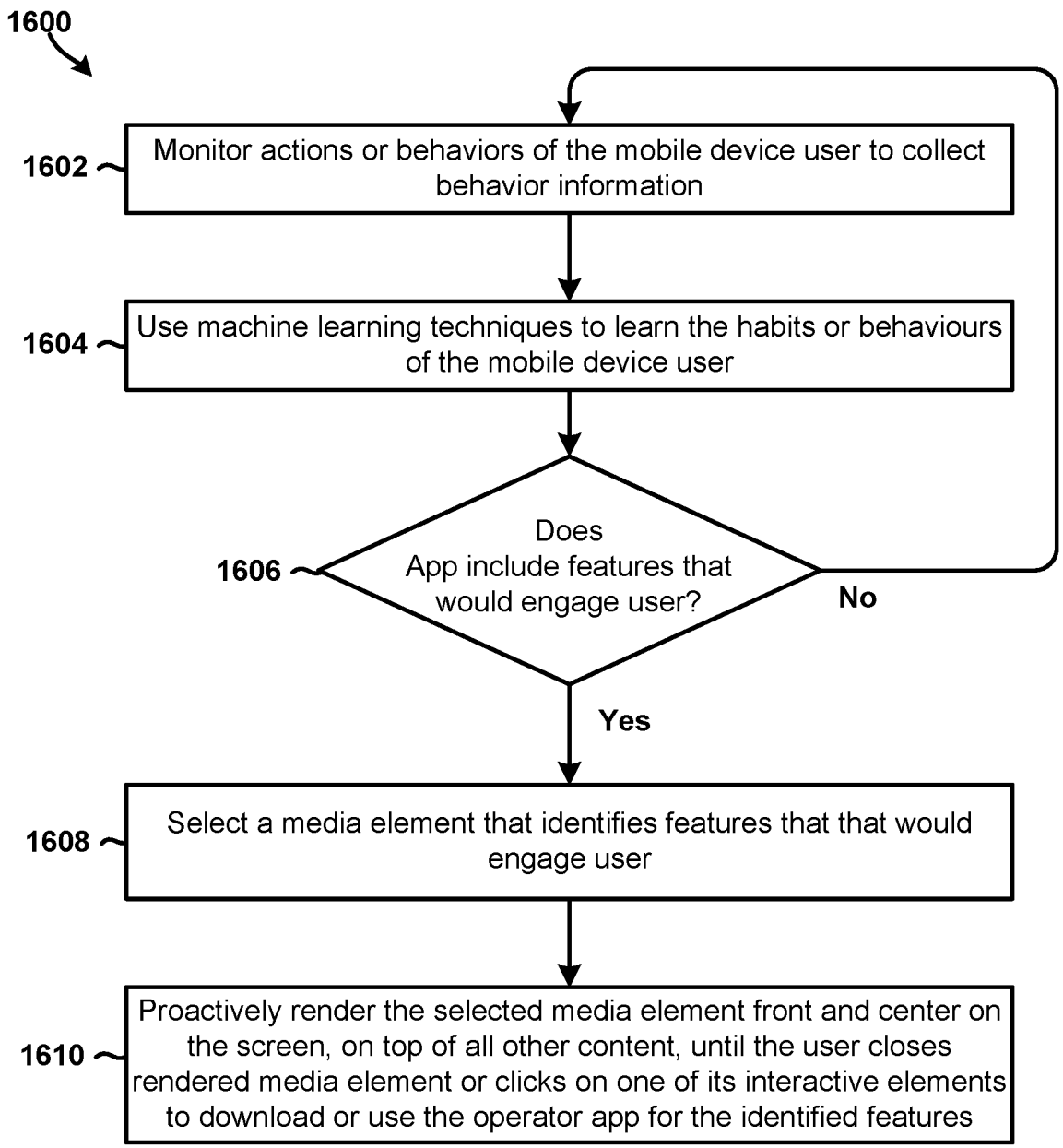
FIG. 16 is a process flow diagram illustrating a method of driving usage of operator apps and web-based systems in accordance with an embodiment.

FIG. 16 illustrates a method 1600 of driving usage of operator apps and web-based systems in accordance with an embodiment. All or portions of method 1600 may be performed by one or more processors in a server or mobile device. In block 1602, a processor may monitor actions or behaviors of the mobile device user, and store information identifying the monitored actions/behaviors in a datastore or memory. In block 1604, the processor may use machine learning techniques to learn the habits or behaviours of the mobile device user. For example, the processor may generate behavior information structures, apply the generated behavior information structures to machine learning classifier models to generate a result, compute a weighted average of the result, compare the weighted average to one or more threshold values (e.g., a upper threshold, lower threshold, etc.), and classify the user as having a specific habit (or not having a specific habit) in response to determining that the weighted average exceeds a threshold.

In determination block 1606, the processor may determine whether the operator app or web-based system of telecommunications service provider includes features that would engage the mobile device user based on the learned habits/behaviours. In response to determining, based on the learned habits or behaviours of the mobile device user, that operator app or web-based system does not include any features that have a high probability of engaging the mobile device user (i.e., determination block 1606="No"), the processor may continue monitoring/store actions or behaviors of the mobile device user and learning the habits or behaviours of the mobile device user in blocks 1602 and 1604.

In response to determining, based on the learned habits or behaviours of the mobile device user, that operator app or web-based system includes features that have a high probability of engaging the mobile device user (i.e., determination block 1606="Yes"), the processor may select a media element that identifies those features in block 1608. In block 1610, the processor may render the selected media element front and center on the screen, on top of all other content, until the user closes rendered media element or clicks on one of its interactive elements to download or use the operator app for the identified features.

Figure 17:
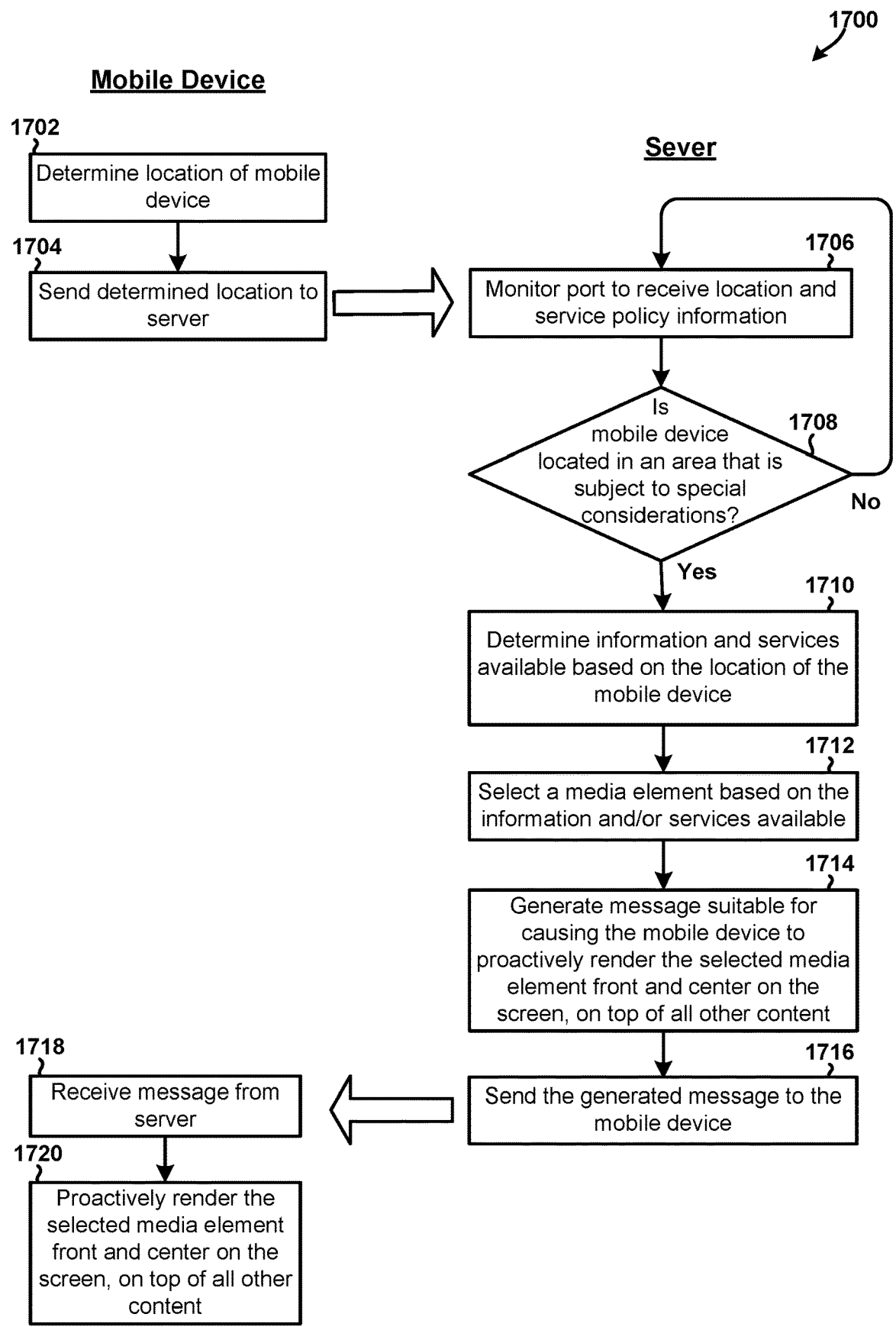
FIGS. 17 and 18 are process flow diagrams illustrating methods of proactively selecting and rendering media elements in accordance with various embodiments.

FIG. 17 illustrates a method 1700 of proactively selecting and rendering media elements in accordance with an embodiment. All or portions of method 1700 may be performed by one or more processors in a server or mobile device. In block 1702, a processor in the mobile device may determine the location of the mobile device, such as by receiving location information from a network server, activating a global positioning system (GPS) receiver, or using other location determination technologies known in the art. In block 1704, the mobile device processor may send the location information to a server device.

In block 1706, a processor in a server computing device may activate circuitry or monitor ports to receive information identifying the current location of the mobile device and service/coverage policy information, either from the mobile device itself or from another network component (e.g., base station, core network component, service provider network component, etc.).

In determination block 1708, the server processor may determine whether mobile device is currently located in an area that is subject to special considerations. For example, the server processor may determine whether the mobile device is currently located in an area that is subject to a severe weather warning (e.g., area expected to be hit by a hurricane, etc.), and whether the telecommunication service provider has instituted service/coverage policies that are relevant to the mobile device during such severe weather events. In response to determining that the mobile device is not currently located in an area that is subject to special considerations (i.e., determination block 1708="No"), the server processor may reactivate circuitry or continue to monitor ports to receive information identifying the current location of the mobile device or updated service/coverage policies in block 1706.

In response to determining that the mobile device is currently located in an area that is subject to special considerations (i.e., determination block 1708="Yes"), the server processor may determine information and service/coverage policies that are available to the mobile device based on the location of the mobile device in block 1710. In block 1712, the server processor may select a media element based on the information and/or services available. Alternatively or in addition, the server processor may proactively determine that there is a high probability that the mobile device user will contact the customer service center to seek information regarding the device's service/coverage during a severe weather event in block 1710.

In block 1712, the server processor may select a media element that includes hyperlinks or other interactive elements based on the information and/or service/coverage policies available for/to that mobile device. For example, the server processor may that select a media element identifies the service/coverage policies relevant to that device during the severe weather event, that identifies special polices put in place by the service provider during the severe weather event (e.g., data relief and free voice calls for the period of emergency, etc.), includes links to download and install an operator app on the device, or other similar information or interactive elements.

In block 1714, the server processor may generate a communication message or a campaign that includes information suitable for causing the mobile device to render the selected media elements front and canter on the screen, on top of all other content. In block 1716, the server processor may send the generated message or campaign to the mobile device.

In block 1718, the mobile device processor may receive the communication message or campaign from the server device. In block 1718, the mobile device processor may render the selected media element in response to receiving the message or campaign. In some embodiments, in block 1718, the mobile device processor may render the selected media element front and center on the mobile device's screen, on top of all other content, when the user is engaged with the mobile device and/or conducting an activity or task that is relevant to the content of the media element.

Figure 18:
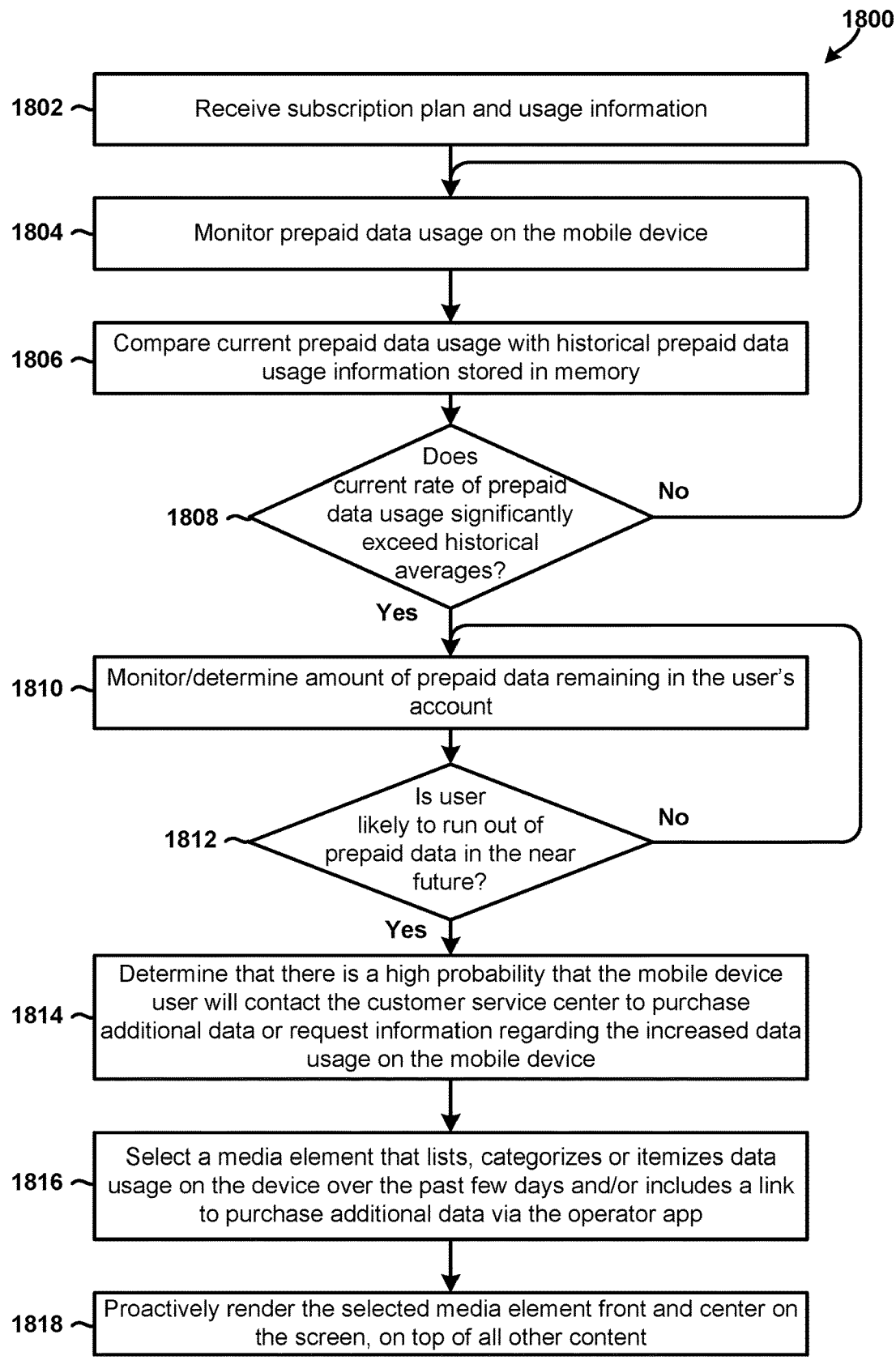

FIG. 18 illustrates a method 1800 of proactively selecting and rendering media elements in accordance with another embodiment. All or portions of method 1800 may be performed by one or more processors in a server or mobile device.

In block 1802, the mobile device may receive subscription plan and usage information from a server computing device. In block 1804, the mobile device (or a server computing device, etc.) may monitor prepaid data usage on the mobile device. In block 1806, the mobile device may compare current prepaid data usage with historical prepaid data usage information stored in memory (e.g., a memory of the mobile device, a datastore associated with a server in the service provider network, etc.).

In determination block 1808, the mobile device may determine whether current rate of prepaid data usage significantly exceeds historical averages. For example, if the user's historical prepaid data usage averages indicate that the user uses approximately 5 Gigabits of data per month, and has used 1.8 Gigabits of data in the first two days of the month, the mobile device may determine that current rate of prepaid data usage significantly exceeds historical averages.

In response to determining that current rate of prepaid data usage does not significantly exceed historical averages (i.e., determination block 1808="No"), the mobile device may continue monitoring prepaid data usage on the mobile device in block 1804. In response to determining that current rate of prepaid data usage significantly exceeds historical averages (i.e., determination block 1808="Yes"), the mobile device may monitor/determine amount of prepaid data remaining in the user's account in block 1810.

In determination block 1812, the mobile device may determine whether the user is likely to run out of prepaid data in the near future (e.g., next 5 minutes, next hour, next day, etc.). In response to determining that the user is not likely to run out of prepaid data in the immediate future (i.e., determination block 1812="No"), the mobile device may continue monitoring the amount of prepaid data remaining in the user's account in block 1810. In response to determining that the user is likely to run out of prepaid data in the immediate future (i.e., determination block 1812="Yes"), the mobile device may determine that there is a high probability that the mobile device user will contact the customer service center to purchase additional data or request information regarding the increased data usage on the mobile device in block 1814.

In block 1816, the mobile device may select a media element that lists, categorizes or itemizes data usage on the device over the past few days and/or includes a link to purchase additional data via the operator app. In block 1816, the mobile device may proactively render the selected media element front and center on the screen, on top of all other content. By rendering the media elements when the user is likely to run out of prepaid data, the embodiments render the elements when the user is engaged with the mobile device and/or conducting an activity or task that is relevant to the content of the media element.

Figure 19:
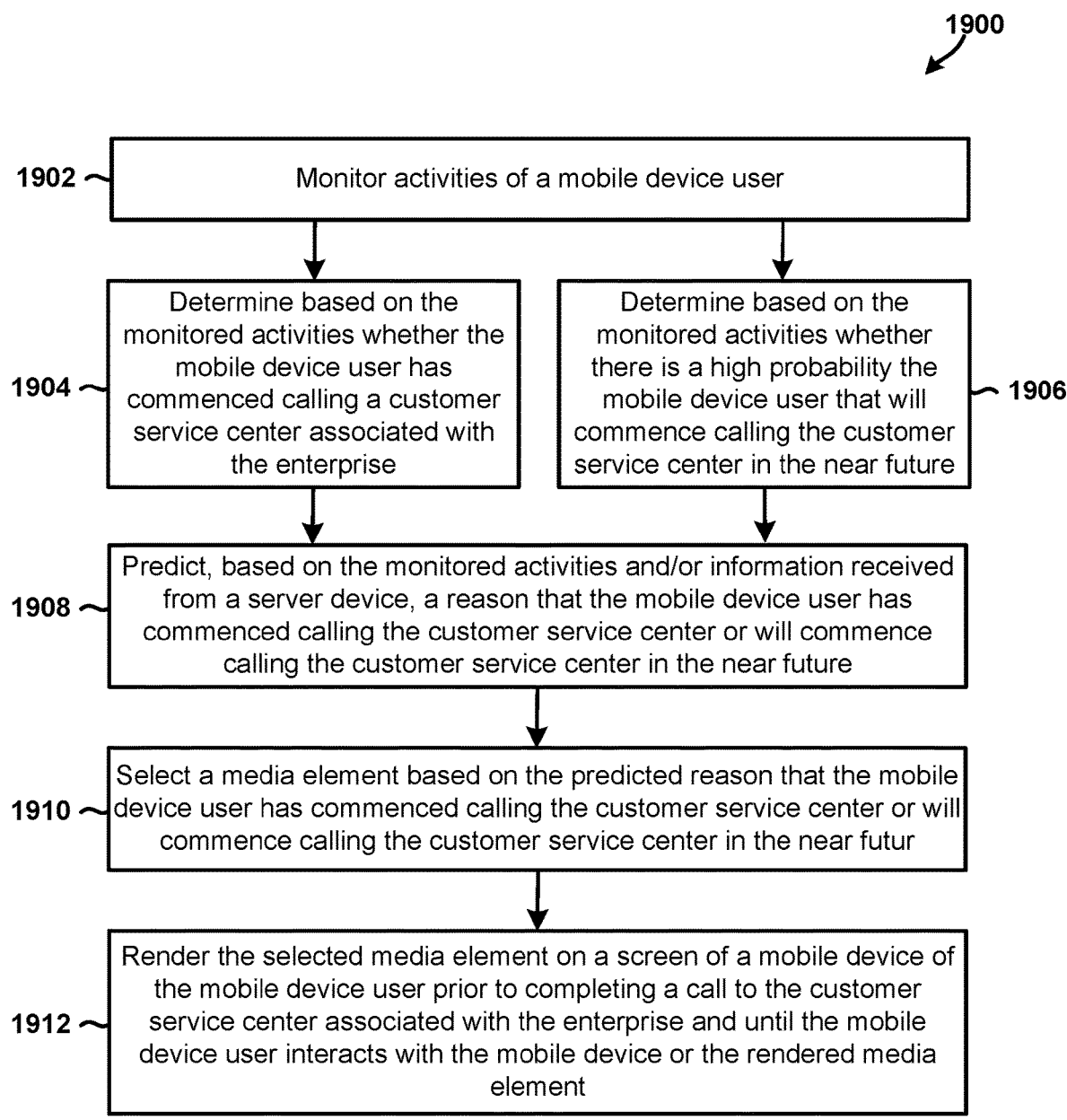
FIG. 19 is a process flow diagram illustrating a method of redirecting calls to a customer service center of an enterprise in accordance with some embodiments.

FIG. 19 illustrates a method 1900 of redirecting calls to a customer service center of an enterprise in accordance with some embodiments. All or portions of method 1900 may be performed by one or more processors in a server or mobile device. In block 1902, the mobile device or the server device may monitor activities of a mobile device user, such as by performing any or all of the operations discussed above with reference to blocks 702-710, 802, 1602, 1604, 1706-1710, 1802-1812, etc. For example, as discussed above with reference to block 702, the mobile device or the server device may generate a behavior information structure that characterizes the subscriber, the mobile device user, mobile device, or the monitored actions/behaviors of the mobile device user or mobile device in block 1902.

In block 1904, the mobile device or the server device may determine, based on the monitored activities, whether the mobile device user has commenced calling a customer service center associated with the enterprise (or whether a telephone call has been initiated between the mobile device and a second telephone device). For example, in block 1904, a processor in the mobile device or the server device may compare numbers entered by the mobile device user to numbers included in telephone number campaign received from the server device, and determine that the mobile device user has commenced calling the customer service center associated with the enterprise in response to determining that a sequence the numbers entered by the mobile device user match a corresponding sequence numbers included in telephone number campaign received from the server device.

Alternatively or in addition to the operations in block 1904, the processor may determine, based on the monitored activities, whether there is a high probability that the mobile device user will commence calling the customer service center in the near future in block 1906, which may be accomplished performing any or all of the operations discussed above with reference to block 804. As a further example, in block 1906, the processor may determine an amount of time that has passed since a bill was sent to the mobile device user, determine a frequency in which the mobile device user has contacted the customer service center within the amount of time that has passed since the bill was sent to the mobile device user, determine a frequency of user interaction with the mobile device over an immediately preceding time period, and determine whether there is the high probability that the mobile device user will commence calling the customer service center in the near future based on the frequency in which the mobile device user has contacted the customer service center within the amount of time that has passed since the bill was sent to the mobile device user and the frequency of user interaction with the mobile device over the immediately preceding time period.

It should be understood that, in various embodiments, the processor may be configured to perform the operations in block 1904, the operations in block 1906, or both. It should be also understood that the operations in blocks 1904 and 1906 may be performed in any order and/or in response to one another. For example, in some embodiments, the processor may be configured to perform the operations in block 1906 in response to determining in block 1904 that the mobile device user has not yet commenced calling the customer service center associated with the enterprise.

In block 1908, a processor in the mobile device or in the server device may predict, based on the monitored activities and/or information received from a server device, a reason that the mobile device user has commenced calling the customer service center or will commence calling the customer service center in the near future. The processor may predict the reason using any or all of information, technologies and/or techniques discussed in this application, including any or all of the usage history of the mobile device, subscriber account information, artificial intelligence, machine learning, heuristics, statistical modelling, case-based reasoning, lazy learners, Bayesian classifiers, distributed voting, reinforcement learning, fuzzy rule-based learning, adaptive fuzzy inference, mixture-model techniques, etc. As an example, in block 1908, the processor may determine, based on the usage history of the mobile device, the number of times that the mobile device user has contacted the customer service center within a time period subsequent to receiving a bill to submit payment, and predict based on this usage history (or based on the number of times that the mobile device user has contacted the customer service center within the time period subsequent to receiving the bill to submit payment, etc.) that the reason that the mobile device user has commenced calling the customer service center or will commence calling the customer service center in the near future is to submit payment.

In block 1910, the processor may select a media element (e.g., image, video, text, links, etc.) based on the predicted reason that the mobile device user has commenced calling the customer service center or will commence calling the customer service center in the near future. For example, the mobile device processor may select a media element that includes hyperlinks or other interactive elements that allow the mobile device user to download and use an operator app, submit payment electronically, identify the service/coverage policies relevant to that device during a severe weather event, identify special polices put in place by the service provider during a severe weather event (e.g., data relief and free voice calls for the period of emergency, etc.), that lists, categorizes or itemizes data usage on the device over the past few days, that includes a link to purchase additional data via the operator app, that includes features that would engage the mobile device user based on learned habits/behaviors of the user, or which include other similar information or interactive elements.

In block 1912, the mobile device may render the selected media element on a screen of a mobile device of the mobile device user prior to completing a call to the customer service center associated with the enterprise and until the mobile device user interacts with the mobile device or the rendered media element. For example, in block 1912 the mobile device may render the selected media element front and center on the screen of the mobile device, on top of all other content displayed on the screen of the mobile device, prior to completing a call to the customer service center associated with the enterprise and until the mobile device user interacts with the mobile device or the rendered media element. As a further example, the in block 1912 the mobile device may render the selected media element front and center on the screen, on top of all other content, until the user closes rendered media element or clicks on one of its interactive elements to download or use the operator app (e.g., to submit payment, upgrade a device, etc.).

Figure 20:
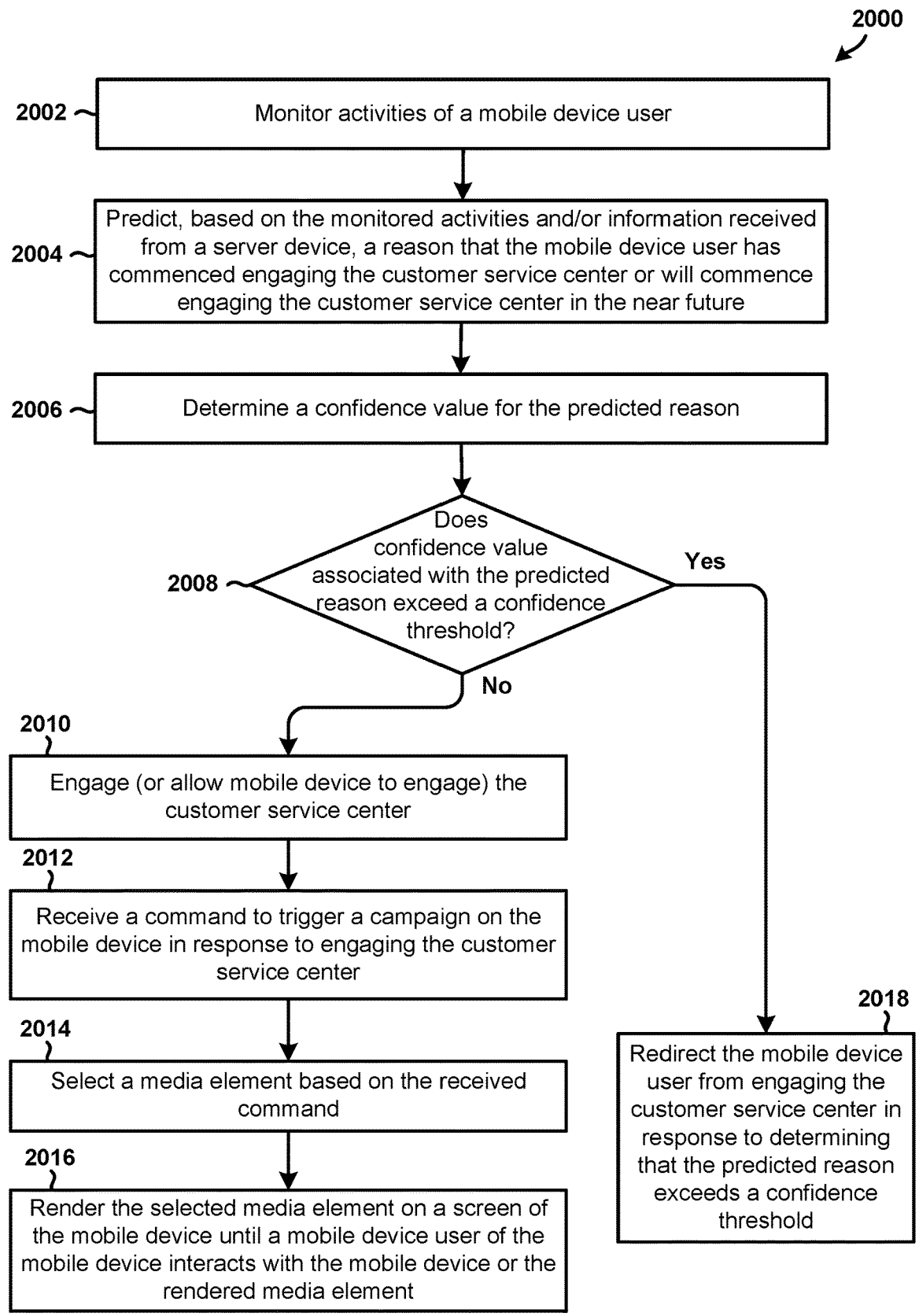
FIGS. 20, 21A, 21B and 22 are process flow diagrams illustrating methods of reducing the durations of sessions or client engagements with a customer service center (e.g., reducing the average durations of calls to the center) in accordance with some embodiments.

FIG. 20 illustrates a method 2000 of reducing the durations of client engagements with a customer service center of an enterprise in accordance with some embodiments. All or portions of method 2000 may be performed by one or more processors in a server or mobile device. In block 2002, a processor in a mobile device or in a server device may monitor activities of a mobile device user, such as by performing any or all of the operations discussed above with reference to blocks 702-710, 802, 1602, 1604, 1706-1710, 1802-1812, 1902, etc.

In block 2004, the processor may predict, based on the monitored activities and/or information received from a server device, a reason that the mobile device user has commenced engaging the customer service center or will commence engaging the customer service center in the near future. The processor may predict the reason using any or all of the prediction techniques discussed in this application (e.g., the techniques discussed above with reference to block 1908, etc.). In block 2006, the processor may determine a confidence value for the predicted reason, which may be accomplished using any technique discussed in this application or known in the art. In determination block 2008, the processor may determine whether the confidence value associated with the predicted reason exceeds a confidence threshold.

In response to determining that the confidence value associated with the predicted reason does not exceed the confidence threshold (i.e., determination block 2008="No"), the processor may engage the customer service center associated with the enterprise, or allow the mobile device or mobile device user to engage the customer service center, in block 2010. For example, the mobile device may send a communication message (e.g., text message, etc.) to or establish a voice call with the customer service center associated with the enterprise in block 2002.

In block 2012, the mobile device may receive a command to trigger a campaign on the mobile device. In some embodiments, the mobile device may receive the command in block 2012 in response to engaging the customer service center associated with the enterprise in block 2010. In block 2014, the processor may select a media element (e.g., image, video, text, links, etc.) based on the received command and/or based on any of the information, techniques or technologies discussed in this application (e.g., with reference to block 1910, etc.). In block 2016, the processor may render the selected media element on a screen of the mobile device until a mobile device user of the mobile device interacts with the mobile device or the rendered media element. The processor may also render the selected media element in block 2016 by performing any or all of the operations discussed in the application (e.g., with reference to block 1912, etc.).

In response to determining that the confidence value associated with the predicted reason exceeds the confidence threshold (i.e., determination block 2008="Yes"), the processor may redirect the mobile device user from engaging the customer service center in block 2018. In some embodiments, the processor may redirect the mobile device user from engaging the customer service center (e.g., by performing the operations of method 1900, etc.).

Figure 21A:
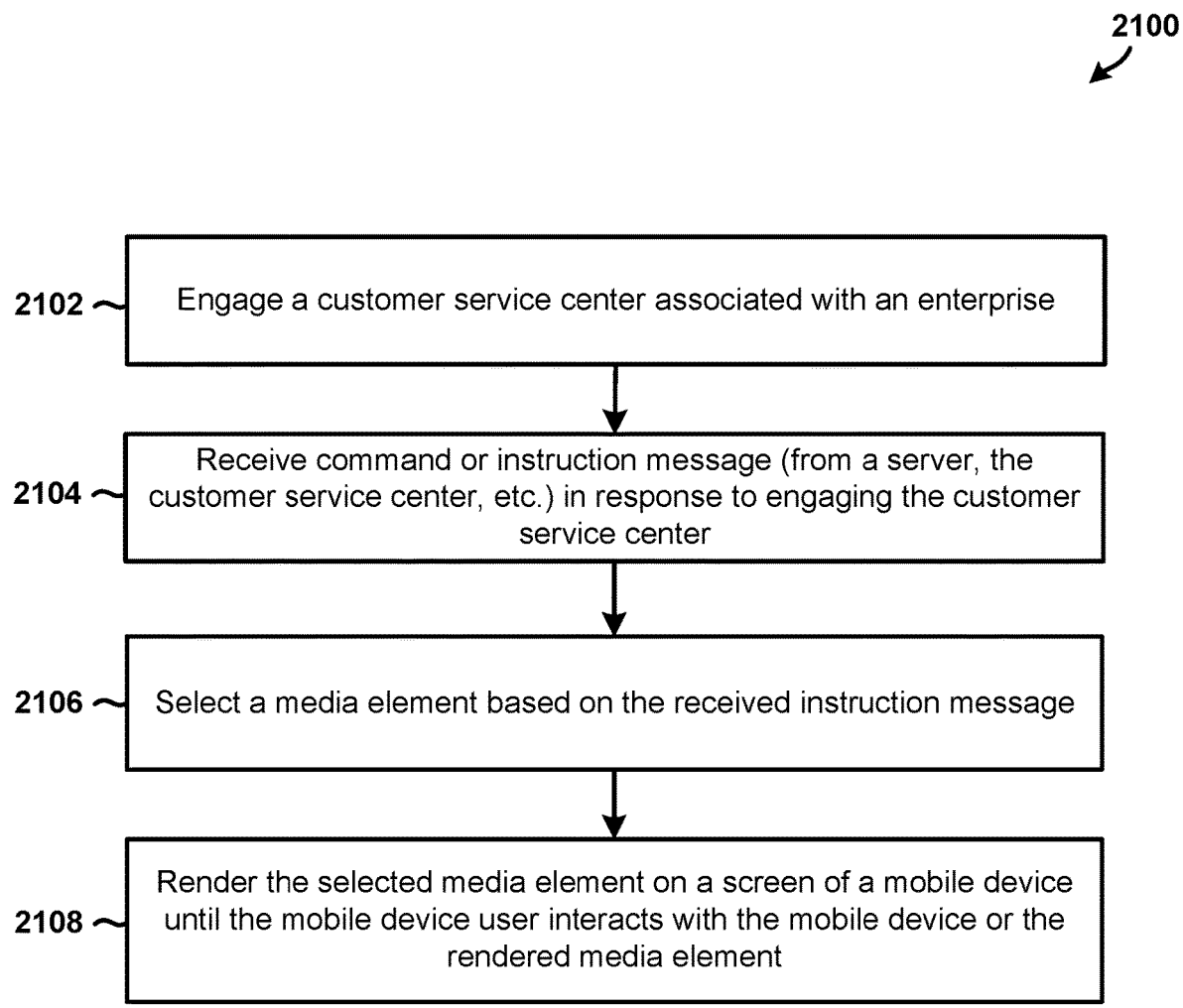

FIG. 21A illustrates a method 2100 of reducing the durations of sessions or client engagements with a customer service center of an enterprise in accordance with another embodiment. All or portions of method 2100 may be performed by one or more processors in a server or mobile device. In block 2102, a processor in a mobile device or in a server device may engage a customer service center associated with an enterprise and/or perform any or all of the operations discussed above with reference to block 2010. In block 2104, the processor may receive command or instruction message (from a server, the customer service center, etc.) in response to engaging the customer service center. In block 2106, the processor may select a media element (e.g., image, video, text, links, etc.) based on the received command and/or based on any of the information, techniques or technologies discussed in this application (e.g., with reference to blocks 1910, 2014, etc.). In block 2108, the processor may render the selected media element on a screen of the mobile device by performing any or all of the operations discussed in the application (e.g., with reference to blocks 1912, 2016, etc.).

Figure 21B:
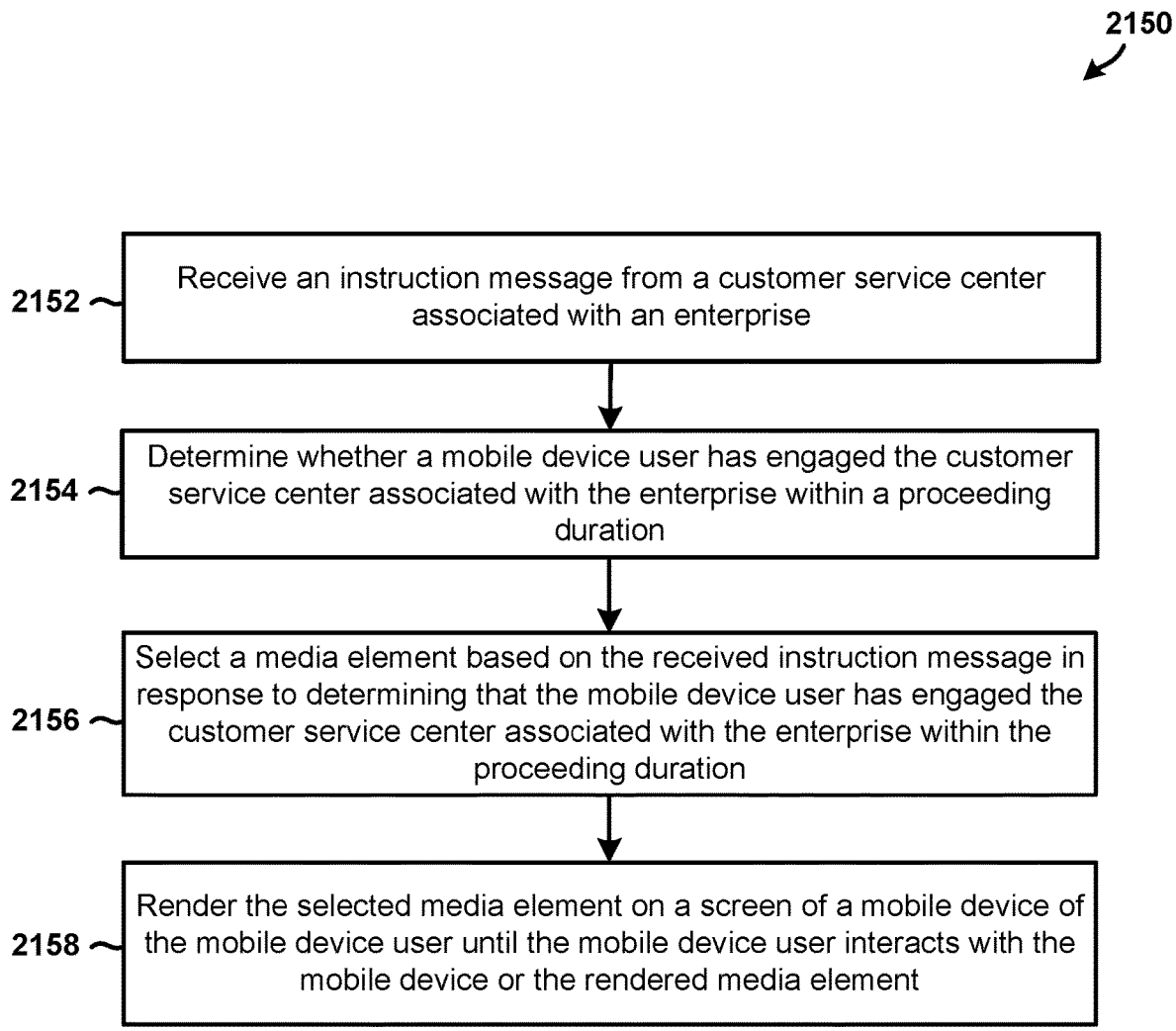

FIG. 21B illustrates a method 2150 of reducing the durations of sessions or client engagements with a customer service center of an enterprise in accordance with the embodiments. All or portions of method 2150 may be performed by one or more processors in a server or mobile device. In some embodiments, method 2150 may be performed after a processor in a mobile device or in a server device monitors the activities of a mobile device user, and predicts a reason (e.g., based on the monitored activities, information received from a server device, etc.) that the mobile device user has engaged the customer service center. In some embodiments, method 2150 may be performed after a processor sends or receives a predicted reason for the mobile device user engaging the customer service center (e.g., to pay a bill, inquire about service plans, etc.).

In block 2152, a processor in a mobile device or in a server device may receive an instruction message from a customer service center associated with an enterprise. For example, in block 2152, the processor may receive a command to trigger a campaign on the mobile device. The command/campaign may be selected by a server or a customer service representative based on a question asked by the mobile device user via a text message sent from the mobile device to customer service center, based on a question asked by the mobile device user during a voice call between the mobile device and the customer service center, based on a predicted reason that the mobile device user has engaged the customer service center, etc.

In block 2154, the processor may determine whether a mobile device user has engaged the customer service center associated with the enterprise within a proceeding duration. For example, in block 2154, the processor may determine whether a text message (e.g., SMS, MMS, RTT, instant message, or other forms of electronic messages) has been sent from the mobile device to customer service center associated with the enterprise within the proceeding duration. As another example, in block 2154, the processor may determine whether a data session or a voice call has been established between the mobile device and the customer service center.

In block 2156, the processor may select a media element based on the received instruction message in response to determining that the mobile device user has engaged the customer service center (e.g., established a voice call, sent a text, etc.).

In block 2158, the processor may render the selected media element on a screen of a mobile device of the mobile device user until the mobile device user interacts with the mobile device or the rendered media element. In some embodiments, the mobile device may render the selected media element prior to terminating a voice call (or chat session, data session, voice session, etc.) between the mobile device and the customer service center. That is, the mobile device may render the media element while the user remains on the call with the customer service center.

Figure 22:
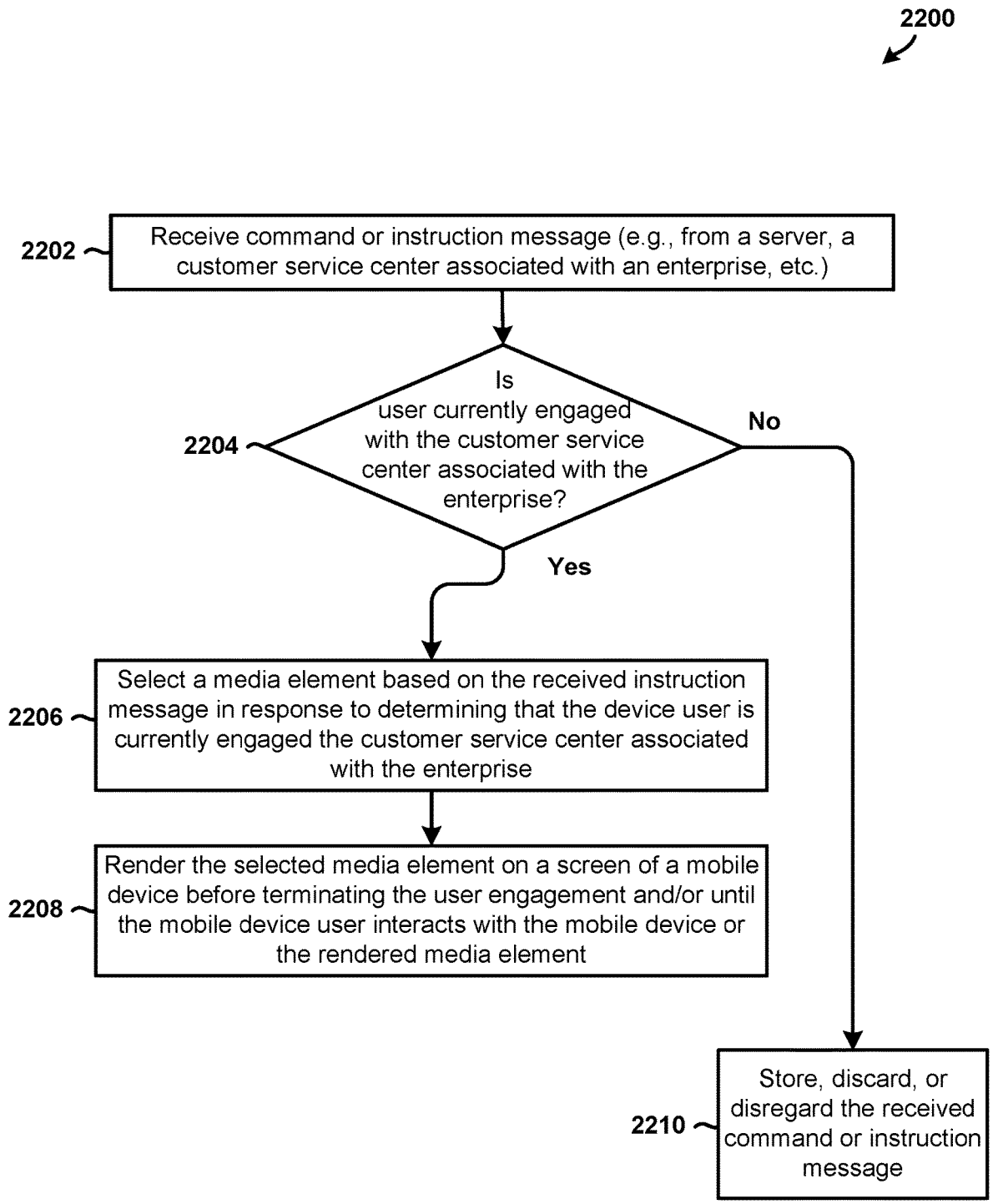
Figure 23:
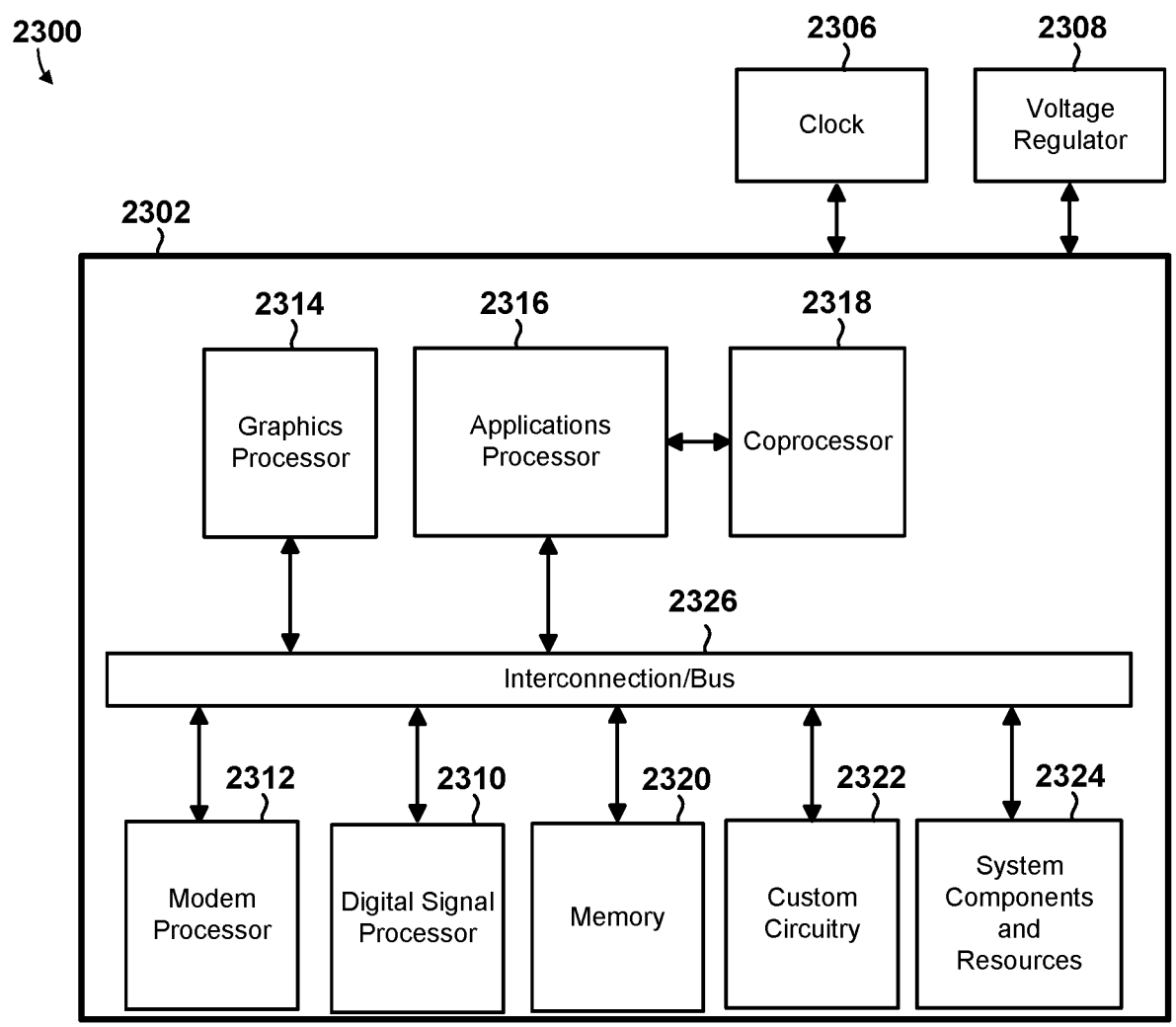
FIG. 23 is a component block diagram illustrating an example computing system architecture that may be used in mobile devices implementing the various embodiments.
Figure 24:
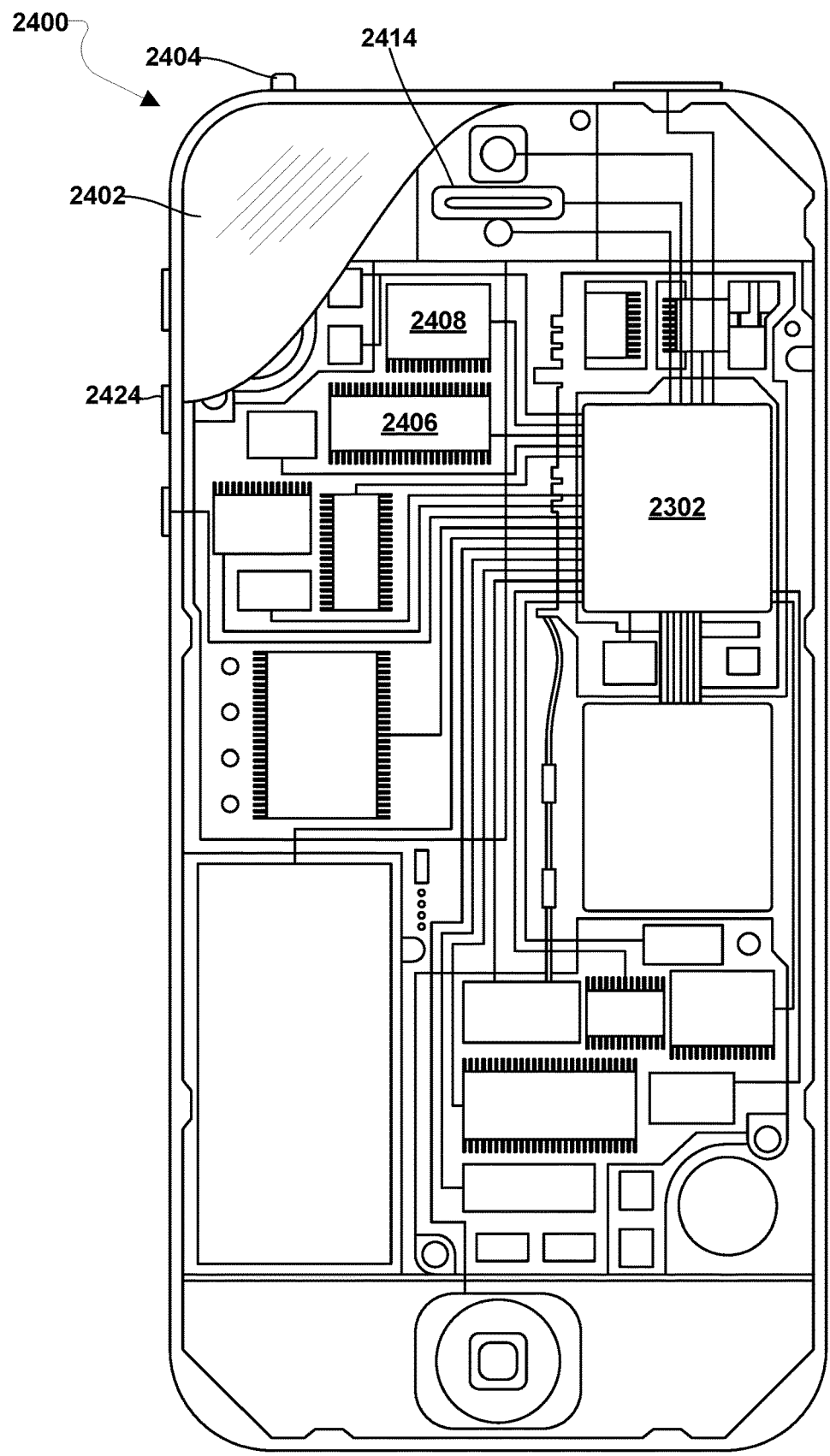
FIG. 24 is a component block diagram illustrating a wireless device suitable for implementing various embodiments.

FIG. 22 illustrates a method 2200 of reducing the durations of client engagements with a customer service center of an enterprise in accordance with another embodiment. All or portions of method 2200 may be performed by one or more processors in a server or mobile device. In block 2202, a processor in a mobile device or in a server device may receive command or instruction message. In determination block 2204, the processor may determine whether the user is currently engaged with a customer service center (e.g., is currently participating in a voice call with the customer service center, recently texted the customer service center, etc.).

In response to determining that the user is currently engaged with the customer service center (i.e., determination block 2204="Yes"), the processor may select a media element based on the received command and/or based on any of the information, techniques or technologies discussed in this application (e.g., with reference to blocks 1910, 2014, 2106, etc.) in block 2206. In block 2208, the processor may render the selected media element on a screen of the mobile device by performing any or all of the operations discussed in the application (e.g., with reference to blocks 1912, 2016, 2108, etc.).

In response to determining that the user is not currently engaged with the customer service center (i.e., determination block 2204="No"), the processor may store, discard, or disregard the received command or instruction message. For example, the processor may store the message so that the corresponding media element may be displayed to the user at a later time when the user is engaged in a activity that is more relevant to the content of the media elements. This may increase the response/engagement rates associated with the enterprise communications, alter existing user behaviors/habits, reduce the average durations of customer calls to customer service centers, and thus reduce the overhead/operating expenses associated with managing or maintaining customer service centers.

Some embodiments may include components (e.g., mobile device, server device, etc.) configured to use expectation-maximization (EM) or other machine learning techniques known in the art to continuously, repeatedly, iteratively, or recursively generate, train, improve, focus, or refine the machine learning classifier models used to generate user profiles, determine whether there is a high probability that the mobile device user will commence calling the customer service center in the near future, determine the motives or reasons (and probabilities for the motives/reasons) that a mobile device user would contact a customer service center of a telecommunication service provider, and/or any of the other determinations disclosed in this application. By using such techniques, the components may repeatedly or continuously refine and otherwise improve the machine learning classifier models until they are capable of classifying a behavior or until the models reach a desired level of accuracy.

In addition to the machine learning techniques discussed in this application, the various embodiments may use any of a variety of other machine learning, behavior-based, pattern recognition or predication techniques known in the art.

FIG. 19 illustrates an example computing system 1900 architecture that may be used in mobile devices implementing the various embodiments. With reference to FIGS. 1-19, the illustrated example computing system 1900 includes a system on chip (SOC) 1902, a clock 1906, and a voltage regulator 1908. In some embodiments, the SOC 1902 may operate as central processing unit (CPU) of the wireless device that carries out the instructions of software application programs by performing the arithmetic, logical, control and input/output (I/O) operations specified by the instructions.

The SOC 1902 may include a digital signal processor (DSP) 1910, a modem processor 1912, a graphics processor 1914, an application processor 1916, one or more coprocessors 1918 (such as vector co-processor) connected to one or more of the processors, memory 1920, custom circuitry 1922, system components and resources 1924, an interconnection/bus module 1926.

Each processor 1910, 1912, 1914, 1916, 1918 may include one or more cores, and each processor/core may perform operations independent of the other processors/cores. For example, the SOC 1902 may include a processor that executes a first type of operating system (such as FreeBSD, LINUX, OS X, etc.) and a processor that executes a second type of operating system (such as MICROSOFT WINDOWS). In addition, any or all of the processors 1910, 1912, 1914, 1916, 1918 may be included as part of a processor cluster architecture (such as a synchronous processor cluster architecture, an asynchronous or heterogeneous processor cluster architecture, etc.).

The SOC 1902 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 1924 of the SOC 1902 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 1924 or custom circuitry 1922 also may include circuitry to interface with peripheral devices, such as cameras, electronic displays, wireless communication devices, external memory chips, etc.

The SOC 1902 may further include an input/output module (not illustrated) for communicating with resources external to the SOC, such as a clock 1906 and a voltage regulator 1908. Resources external to the SOC (such as clock 1906, voltage regulator 1908) may be shared by two or more of the internal SOC processors/cores.

In addition to the example computing system 1900 discussed above, some embodiments may be implemented in a wide variety of other computing systems, which may include a single processor, multiple processors, multicore processors, or any combination thereof.

Various embodiments may be implemented on a variety of wireless devices an example of which is illustrated in FIG. 20 in the form of a smartphone. A smartphone 2000 may include a system on chip 1902 as describe with reference to FIG. 19. Additionally, the smartphone 2000 may include an antenna 2004 for sending and receiving electromagnetic radiation that may be connected to a wireless data link and/or cellular telephone transceiver 2008 coupled to one or more processors in the SOC 1902. Smartphones 2000 typically also include menu selection buttons or rocker switches 2020 for receiving user inputs.

A typical smartphone 2000 also includes a display 2012 coupled to the system on chip 1902. A typical smartphone 2000 also includes a sound encoding/decoding (CODEC) circuit 2006, which digitizes sound received from a microphone into data packets suitable for wireless transmission and decodes received sound data packets to generate analog signals that are provided to the speaker 2014 to generate sound. Also, one or more of the processors in the SOC 1902, transceiver 2008 and CODEC circuit 1706 may include a digital signal processor (DSP) circuit (not shown separately).

As used in this application, the phrases "telecommunications service provider" "telecommunications operator," "service provider network," "operator network" and the like are used interchangeably herein any may refer to any network, entity or component suitable for providing users with access to the Internet or internet protocol (IP) services. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

As used in this application, the terms "component," "system," "engine," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The functions described in various embodiments may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method of redirecting calls made to a customer service center of an enterprise, comprising:
    monitoring activities of a mobile device user;
    determining based on the monitored activities at least one of:
        whether the mobile device user has commenced calling the customer service center associated with the enterprise; or
        whether there is a high probability that the mobile device user will commence calling the customer service center in the near future;
    determining, based on a usage history of the mobile device, the number of times that the mobile device user has contacted the customer service center within a time period subsequent to receiving a bill;
    predicting, based on the usage history of the mobile device, a reason that the mobile device user has commenced calling the customer service center or will commence calling the customer service center in the near future;
    selecting a media element based on the predicted reason that the mobile device user has commenced calling the customer service center or will commence calling the customer service center in the near future; and
    rendering the selected media element on a screen of a mobile device of the mobile device user prior to completing a call to the customer service center associated with the enterprise and until the mobile device user interacts with the mobile device or the rendered media element.

2. The method of claim 1, further comprising:
    receiving user input indicating that the mobile device user has interacted with the mobile device or the rendered media element; and
    determining whether to invoke a web-based access or control mechanism of the enterprise based on user input.

3. The method of claim 2, further comprising invoking the web-based access or control mechanism of the enterprise by launching a self-care application on the mobile device.

4. The method of claim 1, wherein monitoring activities of the mobile device user comprises monitoring, by a processor in the mobile device, activities of the mobile device user.

5. The method of claim 1, wherein monitoring activities of the mobile device user comprises monitoring, by a processor in a server device, activities of the mobile device user.

6. The method of claim 1, wherein rendering the selected media element on the screen of the mobile device prior to completing the call to the customer service center associated with the enterprise and until the mobile device user interacts with the mobile device or the rendered media element comprises:
rendering the selected media element front and center on the screen of the mobile device, on top of all other content displayed on the screen of the mobile device, prior to completing the call to the customer service center associated with the enterprise and until the mobile device user interacts with the mobile device or the rendered media element.

7. The method of claim 1, wherein determining based on the monitored activities at least one of whether the mobile device user has commenced calling the customer service center associated with the enterprise or whether there is the high probability that the mobile device user will commence calling the customer service center in the near future comprises:
comparing numbers entered by the mobile device user to numbers included in a telephone number campaign received from a server device; and
determining that the mobile device user has commenced calling the customer service center associated with the enterprise in response to determining that a sequence the numbers entered by the mobile device user match corresponding sequence numbers included in the telephone number campaign received from the server device.

8. The method of claim 1, wherein determining based on the monitored activities at least one of whether the mobile device user has commenced calling the customer service center associated with the enterprise or whether there is the high probability that the mobile device user will commence calling the customer service center in the near future comprises:
determining an amount of time that has passed since a bill was sent to the mobile device user;
determining a frequency in which the mobile device user has contacted the customer service center within the amount of time that has passed since the bill was sent to the mobile device user;
determining a frequency of user interaction with the mobile device over an immediately preceding time period; and
determining whether there is the high probability that the mobile device user will commence calling the customer service center in the near future based on the frequency in which the mobile device user has contacted the customer service center within the amount of time that has passed since the bill was sent to the mobile device user and the frequency of user interaction with the mobile device over the immediately preceding time period.

9. The method of claim 1, wherein determining based on the monitored activities at least one of whether the mobile device user has commenced calling the customer service center associated with the enterprise or whether there is the high probability that the mobile device user will commence calling the customer service center in the near future comprises:
determining whether the mobile device is roaming;
determining whether the mobile device has subscribed to a roaming package;
determining a frequency in which the mobile device user has contacted the customer service center regarding bills sent to the mobile device user; and
determining that there is the high probability that the mobile device user will commence calling the customer service center in the near future in response to determining that the mobile device is roaming, that the mobile device has not subscribed to a roaming package, and that the frequency in which the mobile device user has contacted the customer service center regarding bills sent to the mobile device user exceeds a threshold value.

10. The method of claim 1, further comprising:
sending location information identifying the location of the mobile device to a server computing device, the server computing device determining that the mobile device is currently located in an area that is subject to a severe weather warning or potential network outage and that there is the high probability that the mobile device user will contact the customer service center in the near future; and
receiving a campaign from the server computing device in response to sending the location information to the server computing device,
wherein selecting the media element based on the predicted reason that the mobile device user has commenced calling the customer service center or will commence calling the customer service center in the near future comprises selecting the media element based on the received campaign.

11. The method of claim 1, wherein predicting, based on the usage history of the mobile device, the reason that the mobile device user has commenced calling the customer service center or will commence calling the customer service center in the near future comprises predicting the reason based on the usage history and at least one or more of:
statistical modelling;
case-based reasoning;
lazy learners;
Bayesian classifiers;
distributed voting;
reinforcement learning;
fuzzy rule-based learning;
adaptive fuzzy inference; or
mixture-model techniques.

12. The method of claim 1, wherein predicting, based on the usage history of the mobile device, the reason that the mobile device user has commenced calling the customer service center or will commence calling the customer service center in the near future further comprises predicting the reason based on the usage history and at least one or more of:
subscriber account information;
artificial intelligence;
machine learning; or
heuristics.

13. The method of claim 12, wherein predicting, based on the usage history of the mobile device, the reason that the mobile device user has commenced calling the customer service center or will commence calling the customer service center in the near future comprises:
determining, based on the usage history of the mobile device, the number of times that the mobile device user has contacted the customer service center within the time period subsequent to receiving the bill to submit payment; and predicting, based on the usage history of the mobile device, that the reason that the mobile device user has commenced calling the customer service center or will commence calling the customer service center in the near future is to submit the payment.

14. A mobile device, comprising:
a processor configured with processor executable software instructions to perform operations comprising:
monitoring activities of a mobile device user;
determining based on the monitored activities at least one of:
whether the mobile device user has commenced calling a customer service center associated with an enterprise; or
whether there is a high probability that the mobile device user will commence calling the customer service center in the near future;
determining, based on a usage history of the mobile device, the number of times that the mobile device user has contacted the customer service center within a time period subsequent to receiving a bill;
predicting, based on the usage history of the mobile device, a reason that the mobile device user has commenced calling the customer service center or will commence calling the customer service center in the near future;
selecting a media element based on the predicted reason that the mobile device user has commenced calling the customer service center or will commence calling the customer service center in the near future; and
rendering the selected media element on a screen of the mobile device prior to completing a call to the customer service center associated with the enterprise and until the mobile device user interacts with the mobile device or the rendered media element.

15. The mobile device of claim 14, wherein the processor is configured with processor executable software instructions to perform operations such that rendering the selected media element on the screen of the mobile device prior to completing the call to the customer service center associated with the enterprise and until the mobile device user interacts with the mobile device or the rendered media element comprises:
rendering the selected media element front and center on the screen of the mobile device, on top of all other content displayed on the screen of the mobile device, prior to completing the call to the customer service center associated with the enterprise and until the mobile device user interacts with the mobile device or the rendered media element.

16. The mobile device of claim 14, wherein the processor is configured with processor executable software instructions to perform operations such that determining based on the monitored activities at least one of whether the mobile device user has commenced calling the customer service center associated with the enterprise or whether there is the high probability that the mobile device user will commence calling the customer service center in the near future comprises:
comparing numbers entered by the mobile device user to numbers included in a telephone number campaign received from the server device; and
determining that the mobile device user has commenced calling the customer service center associated with the enterprise in response to determining that a sequence the numbers entered by the mobile device user match corresponding sequence numbers included in the telephone number campaign received from the server device.

17. The mobile device of claim 14, wherein the processor is configured with processor executable software instructions to perform operations such that determining based on the monitored activities at least one of whether the mobile device user has commenced calling the customer service center associated with the enterprise or whether there is the high probability that the mobile device user will commence calling the customer service center in the near future comprises:
determining an amount of time that has passed since a bill was sent to the mobile device user;
determining a frequency in which the mobile device user has contacted the customer service center within the amount of time that has passed since the bill was sent to the mobile device user;
determining a frequency of user interaction with the mobile device over an immediately preceding time period; and
determining whether there is the high probability that the mobile device user will commence calling the customer service center in the near future based on the frequency in which the mobile device user has contacted the customer service center within the amount of time that has passed since the bill was sent to the mobile device user and the frequency of user interaction with the mobile device over the immediately preceding time period.

18. The mobile device of claim 14, wherein the processor is configured with processor executable software instructions to perform operations such that predicting, based on the usage history of the mobile device, the reason that the mobile device user has commenced calling the customer service center or will commence calling the customer service center in the near future comprises predicting the reason based on the usage history and at least one or more of:
statistical modelling;
case-based reasoning;
lazy learners;
Bayesian classifiers;
distributed voting;
reinforcement learning;
fuzzy rule-based learning;
adaptive fuzzy inference;
mixture-model techniques;
subscriber account information;
artificial intelligence;
machine learning; or
heuristics.

19. The mobile device of claim 18, wherein the processor is configured with processor executable software instructions to perform operations such that predicting, based on the usage history of the mobile device, the reason that the mobile device user has commenced calling the customer service center or will commence calling the customer service center in the near future comprises:
determining, based on the usage history of the mobile device, the number of times that the mobile device user has contacted the customer service center within the time period subsequent to receiving the bill to submit payment; and
predicting, based on the usage history of the mobile device, that the reason that the mobile device user has commenced calling the customer service center or will commence calling the customer service center in the near future is to submit the payment.

20. A non-transitory computer readable storage medium having stored thereon processor-executable software instructions configured to cause a processor to perform operations for redirecting calls made to a customer service center of an enterprise, the operations comprising:
monitoring activities of a mobile device user;
determining based on the monitored activities at least one of:
whether the mobile device user has commenced calling the customer service center associated with the enterprise; or
whether there is a high probability that the mobile device user will commence calling the customer service center in the near future;
determining, based on a usage history of the mobile device, the number of times that the mobile device user has contacted the customer service center within a time period subsequent to receiving a bill;
predicting, based on the usage history of the mobile device, a reason that the mobile device user has commenced calling the customer service center or will commence calling the customer service center in the near future;
selecting a media element based on the predicted reason that the mobile device user has commenced calling the customer service center or will commence calling the customer service center in the near future; and
rendering the selected media element on a screen of a mobile device of the mobile device user prior to completing a call to the customer service center associated with the enterprise and until the mobile device user interacts with the mobile device or the rendered media element.

21. The non-transitory computer readable storage medium of claim 20, wherein the stored processor-executable software instructions are configured to cause a processor to perform operations such that determining based on the monitored activities at least one of whether the mobile device user has commenced calling the customer service center associated with the enterprise or whether there is the high probability that the mobile device user will commence calling the customer service center in the near future comprises:
comparing numbers entered by the mobile device user to numbers included in a telephone number campaign received from the server device; and
determining that the mobile device user has commenced calling the customer service center associated with the enterprise in response to determining that a sequence the numbers entered by the mobile device user match a corresponding sequence numbers included in the telephone number campaign received from the server device.

22. The non-transitory computer readable storage medium of claim 20, wherein the stored processor-executable software instructions are configured to cause a processor to perform operations such that determining based on the monitored activities at least one of whether the mobile device user has commenced calling the customer service center associated with the enterprise or whether there is the high probability that the mobile device user will commence calling the customer service center in the near future comprises:
determining an amount of time that has passed since a bill was sent to the mobile device user;
determining a frequency in which the mobile device user has contacted the customer service center within the amount of time that has passed since the bill was sent to the mobile device user;
determining a frequency of user interaction with the mobile device over an immediately preceding time period; and
determining whether there is the high probability that the mobile device user will commence calling the customer service center in the near future based on the frequency in which the mobile device user has contacted the customer service center within the amount of time that has passed since the bill was sent to the mobile device user and the frequency of user interaction with the mobile device over the immediately preceding time period.

23. The non-transitory computer readable storage medium of claim 20, wherein the stored processor-executable software instructions are configured to cause a processor to perform operations such that predicting, based on the usage history of the mobile device, the reason that the mobile device user has commenced calling the customer service center or will commence calling the customer service center in the near future comprises predicting the reason based on the usage history and at least one or more of:
statistical modelling;
case-based reasoning;
lazy learners;
Bayesian classifiers;
distributed voting;
reinforcement learning;
fuzzy rule-based learning;
adaptive fuzzy inference;
mixture-model techniques;
subscriber account information;
artificial intelligence;
machine learning; or
heuristics.

24. The non-transitory computer readable storage medium of claim 23, wherein the stored processor-executable software instructions are configured to cause a processor to perform operations such that predicting, based on the usage history of the mobile device, the reason that the mobile device user has commenced calling the customer service center or will commence calling the customer service center in the near future comprises:
determining, based on the usage history of the mobile device, the number of times that the mobile device user has contacted the customer service center within the time period subsequent to receiving the bill to submit payment; and
predicting, based on the usage history of the mobile device, that the reason that the mobile device user has commenced calling the customer service center or will commence calling the customer service center in the near future is to submit the payment.

* * * * *